United States Patent [19]

Takano et al.

[11] Patent Number: 4,860,283
[45] Date of Patent: Aug. 22, 1989

[54] DATA MULTIPLEX TRANSMISSION SYSTEM

[75] Inventors: Hiroshi Takano, Tokyo; Tokumichi Murakami; Koh Kamisawa, both of Kanagawa; Hidenori Aoyagi, Tokyo, all of Japan

[73] Assignee: Mitsubishi Denki Kabushiki Kaisha, Tokyo, Japan

[21] Appl. No.: 105,905

[22] Filed: Oct. 7, 1987

[30] Foreign Application Priority Data

Nov. 28, 1986 [JP] Japan .................................. 61-283723
Jun. 16, 1987 [JP] Japan .................................. 62-149630

[51] Int. Cl.$^4$ ............................................... H04J 3/00
[52] U.S. Cl. ........................................ 370/82; 370/84; 370/105
[58] Field of Search .................... 370/82, 84, 102, 105

[56] References Cited

U.S. PATENT DOCUMENTS 3,959,595  5/1976  Smith ...................................... 370/82
4,680,752  7/1987  Takemura et al. ....................... 370/84
4,727,536  2/1988  Reeves et al. .......................... 370/84

Primary Examiner—Douglas W. Olms
Assistant Examiner—Melvin Marcelo
Attorney, Agent, or Firm—Wolf, Greenfield & Sacks

[57] ABSTRACT

A data multiplex transmission system including a data multiplexer, a demultiplex controller and a clock generator for terminal interface is disclosed, in which one block of an error correction code of a variable word length whose rate can be easily matched with the multiplex rate is set into one transmission frame. The multiframes of the least common multiple of the number of multiframes such that the multiplex rate which cannot be matched in one transmission frame is matched are set, thereby allowing the bit stuff reference timing to be integratedly handled. Further, transmission frame header information and control data link are provided, thereby allowing the multiplex transmission to be executed in accordance with a predetermined communication procedure.

This transmission frame can realize the advanced communication by the header information and control data link. Thus, the data multiplex transmission can be performed with a simple construction while keeping the high efficiency and high reliability. Further, the transmission frame pull-in time is reduced by the bit error permission type pattern matching for the multiframe sync bits.

18 Claims, 41 Drawing Sheets

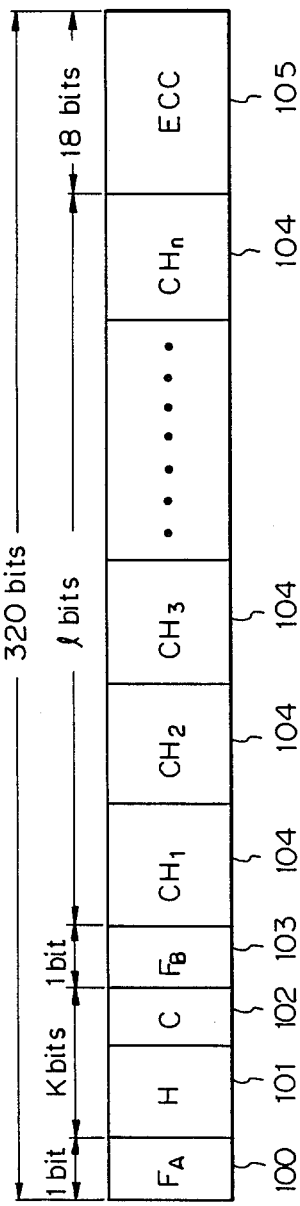

Fig. 3

| FRAME NO. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| $F_A$ | 1 | 0 | 1 | 0 | 1 | 0 | 1 | 0 | 1 | 0 | 1 | 0 | 1 | 0 | 1 |
| H | h | h | h | h | h | h | h | h | h | h | h | h | h | h | h |
| C | m | m | m | m | m | m | m | m | m | m | m | m | m | m | m |
| $F_B$ | $S_0$ | $S_1$ | $S_2$ | $S_3$ | $S_4$ | $S_5$ | $S_6$ | $S_7$ | O | O | O | O | O | O | O |
| FRAME NO. | 16 | 17 | 18 | 19 | 20 | 21 | 22 | 23 | 24 | 25 | 26 | 27 | 28 | 29 | 30 |
| $F_A$ | 0 | 1 | 0 | 1 | 0 | 1 | 0 | 1 | 0 | 1 | 0 | 1 | 0 | 1 | 0 |
| H | h | h | h | h | h | h | h | h | h | h | h | h | h | h | h |
| C | m | m | m | m | m | m | m | m | m | m | m | m | m | m | m |
| $F_B$ | $\overline{S_0}$ | $\overline{S_1}$ | $\overline{S_2}$ | $\overline{S_3}$ | $\overline{S_4}$ | $\overline{S_5}$ | $\overline{S_6}$ | $\overline{S_7}$ | O | O | O | O | O | O | O |

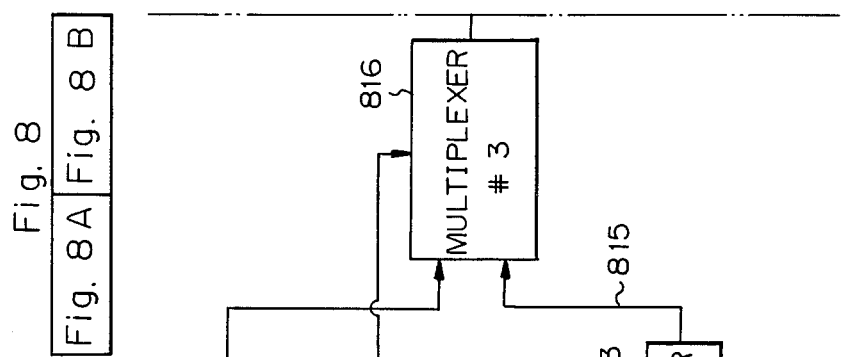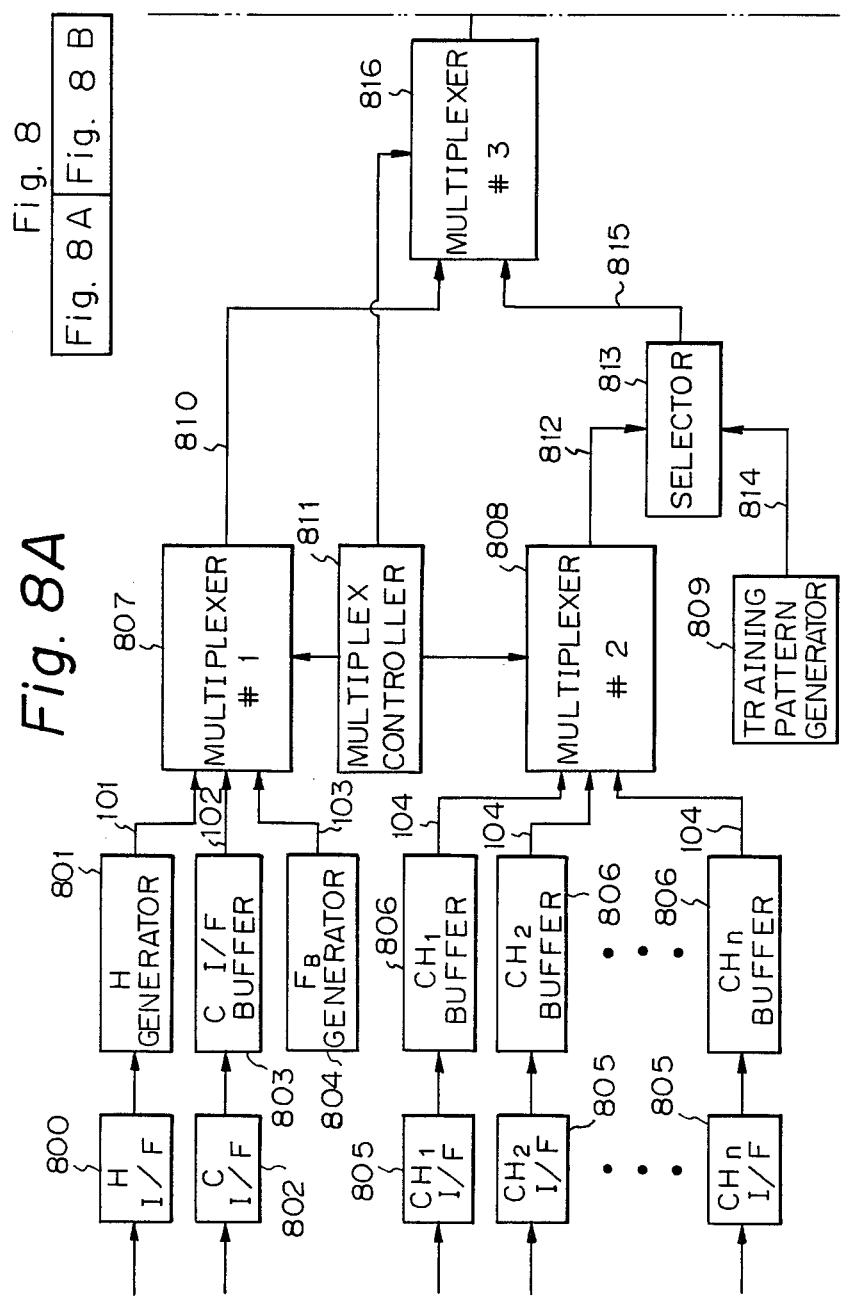

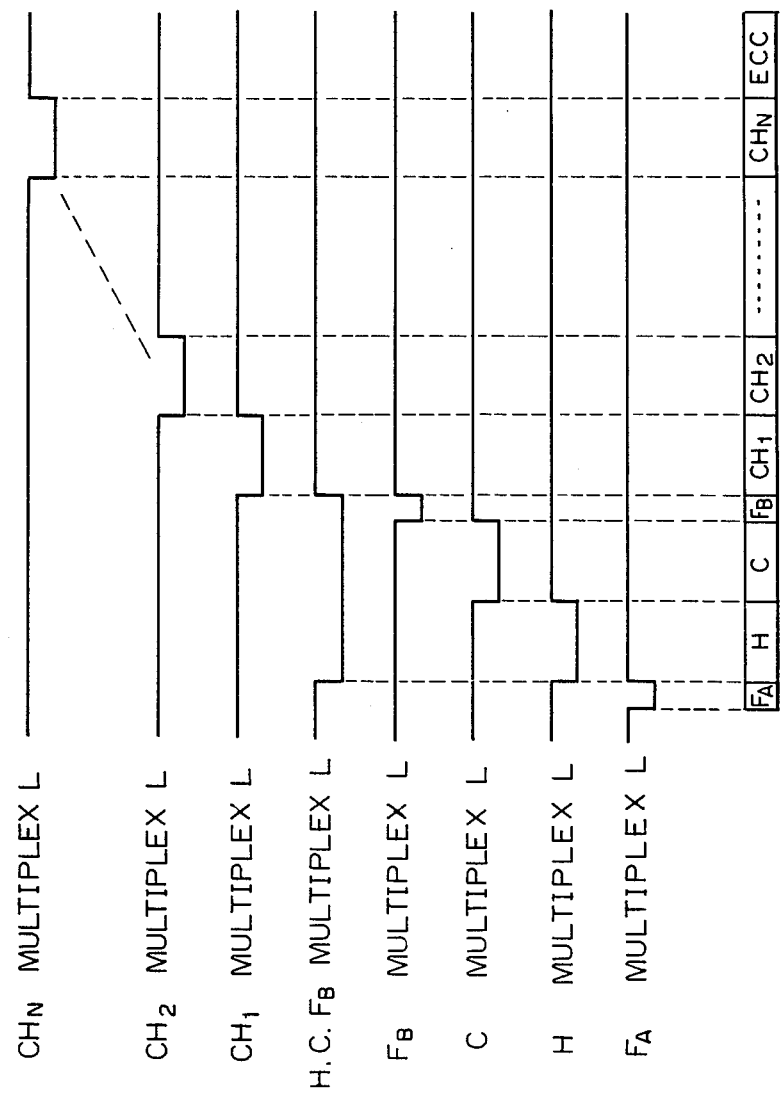

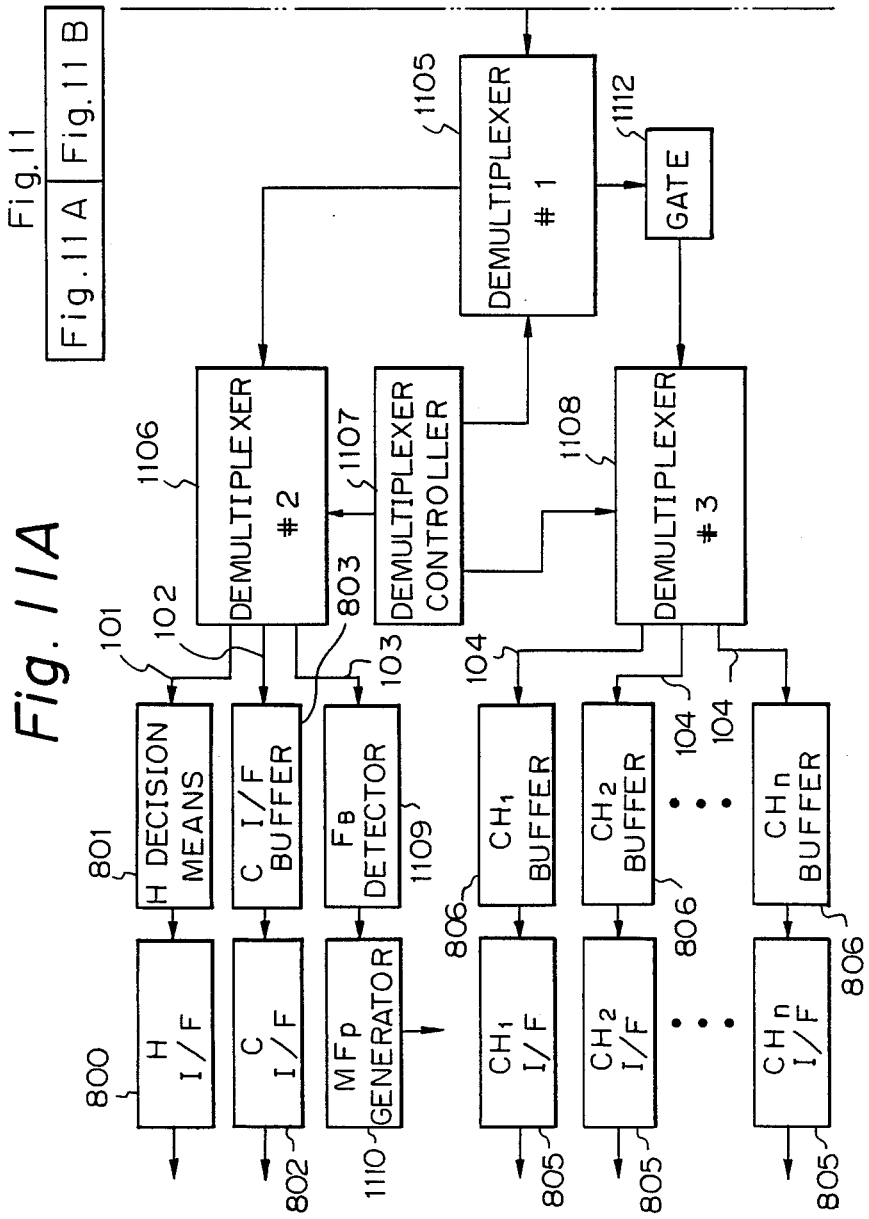

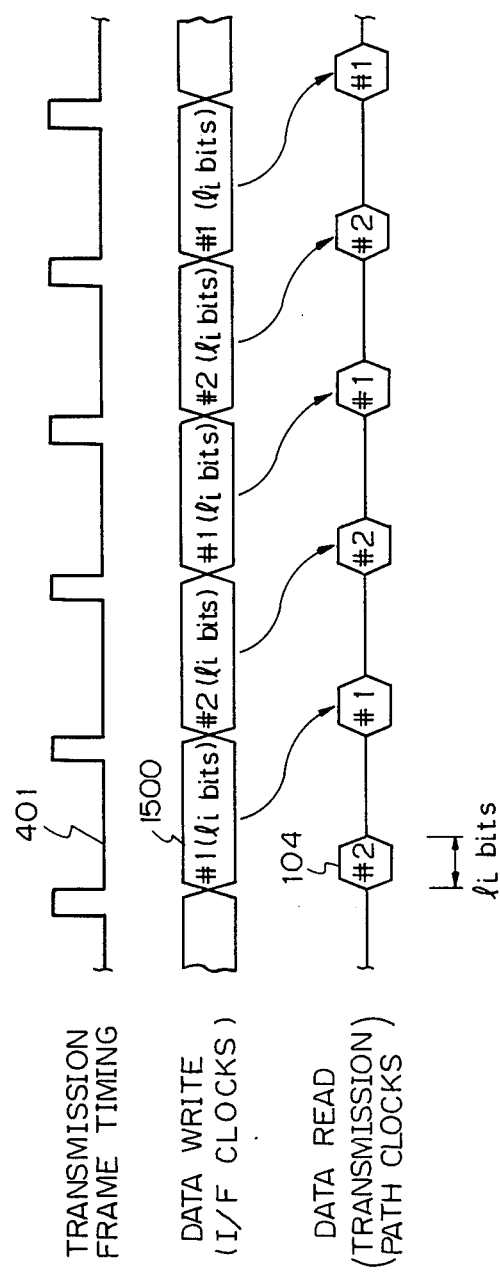

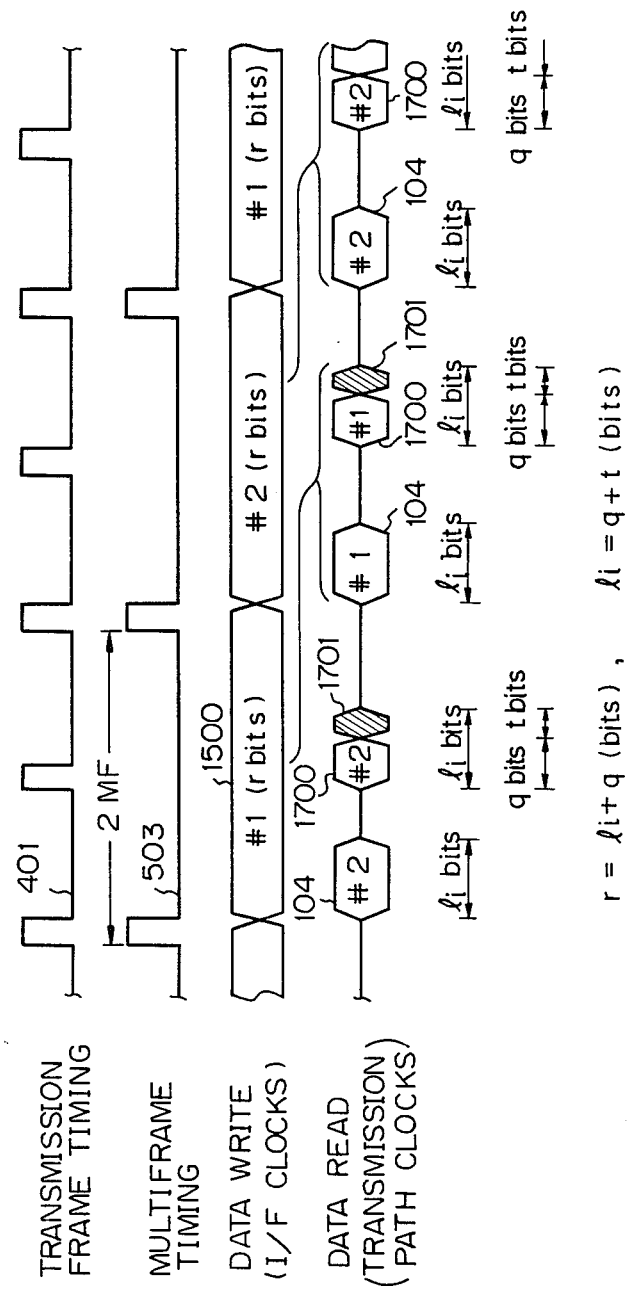

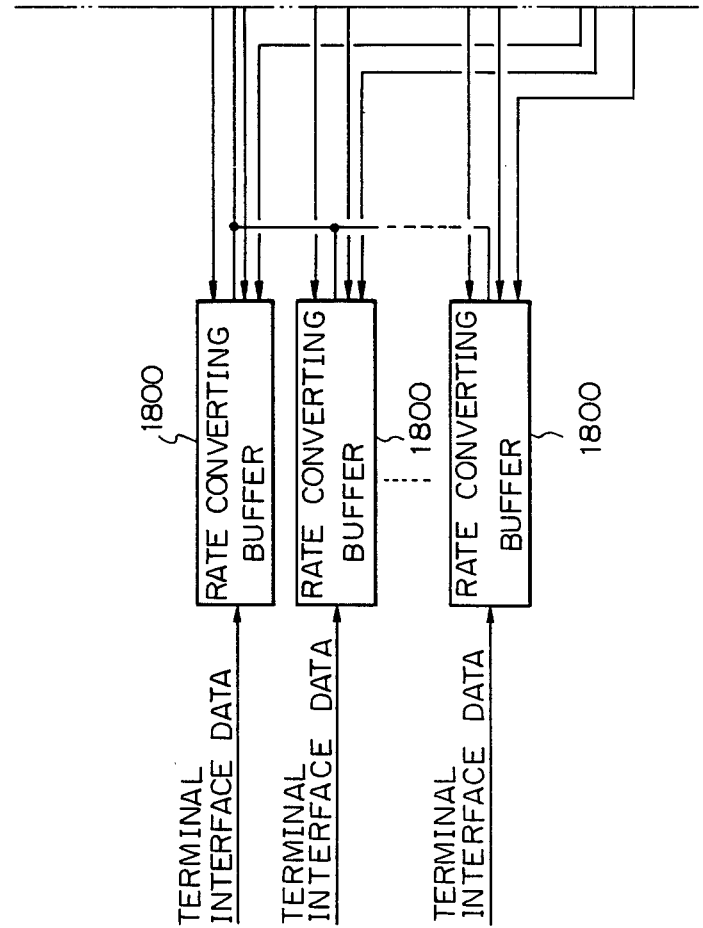

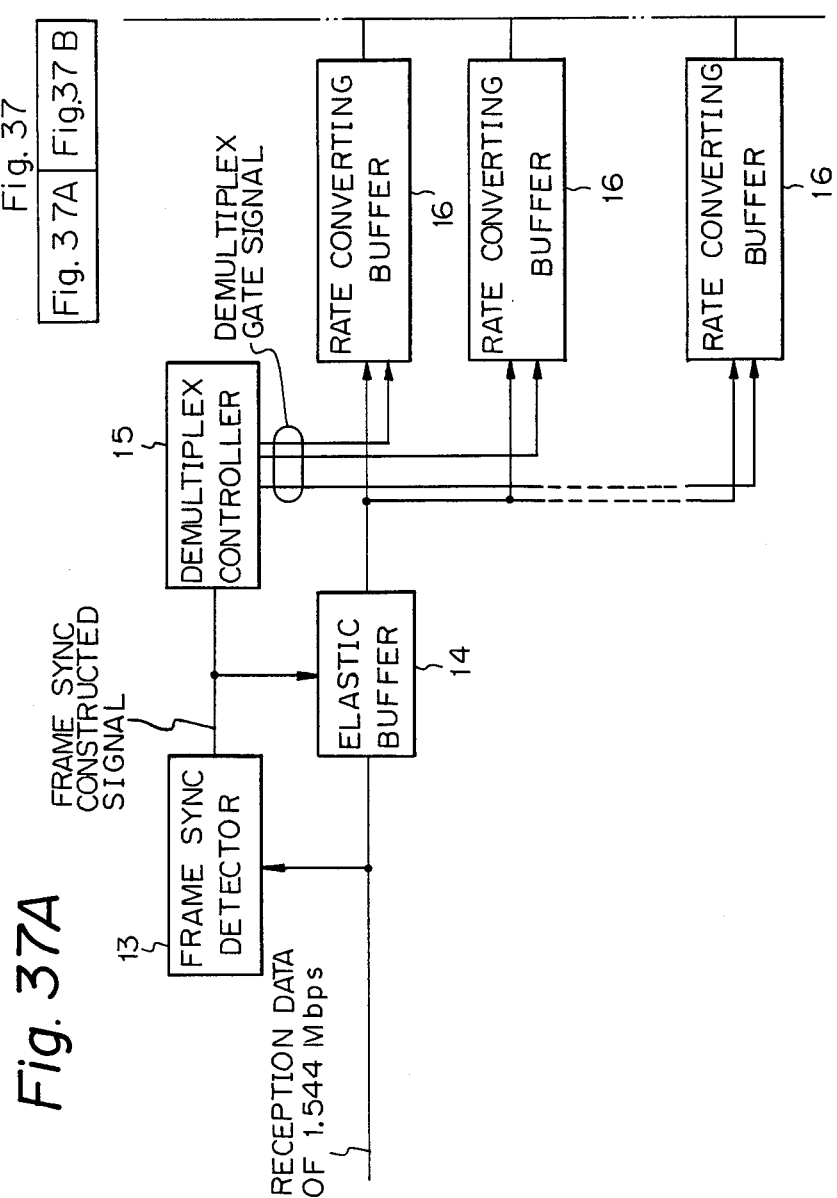

DATA MULTIPLEX TRANSMISSION SYSTEM

BACKGROUND OF THE INVENTION:

1. Field of the invention:

The present invention relates to a multiplex transmission system of digital data and, more particularly, to a digital data multiplex control apparatus and a demultiplex control apparatus of multiplexed data.

2. Description of the Prior Art:

FIG. 32 is a diagram showing a frame format of a frame cons of twenty-four multiframes having a transmission rate of 1.544 Mbps shown in, e.g., the CCITT recommendation G. 704. In the diagram, reference numeral 1 denotes an F bit of one bit/frame and 2 indicates twenty-four data channels of $TS_1$ to $TS_{24}$ to which eight bits/frame are assigned and each of which has the capacity 64 kbps.

FIG. 33 is a diagram showing the content of the F bit 1 in FIG. 32 and shows a state in which a single loop of use is constructed by twenty-four multiframes.

FIG. 34 is a diagram showing a state in which asynchronous data of 1200 bps is multiplexed to the transmission frame shown in FIG. 32. In the diagram, reference numeral 3 denotes an asynchronous data signal of 1200 bps; 4 denotes a signal which is obtained by sampling the asynchronous data 3 of 1200 bps at many points by use of sync (synchronization) clocks of 9600 bps; and 5 denotes an envelope signal train in which the sampled signals 4 are combined every six bits and two bits consisting of an F' bit and an S' bit are added every six bits to thereby form one envelope, and its transmission rate is set at 12.8 kbps, which rate is 8/6 times faster than the 9600 bps of the sync clocks. Numeral 6 denotes a data train of the signal train of 64 kbps which is obtained by time sharingly multiplexing the envelope signal train 5 by the amount of five channels, and 7 indicates a transmission frame which is derived by inserting the signal train of 64 kbps into the TS (time slot) of 1.544 Mbps and multiplexing them.

The operation will now be described. In FIG. 32, the length of a transmission frame is 193 bits and is divided into the F bit 1 consisting of one bit and the 8-bit data channels 2 each consisting of twenty-four time slots.

Since the transmission rate is 1.544 Mbps, a transmission frame period is $$\frac{1.544 \text{ Mbps}}{193 \text{ bits}} = \frac{1}{125 \text{ }\mu\text{sec}} = 8 \text{ kHz}$$

Therefore, the capacity which is assigned to the F bit 1 is given by

F bit: one bit$\times$8 kHz=8 kbps.

The capacity which is assigned to each TS 2 is obtained by

TS: eight bit$\times$8 kHz=64 kbps.

Data are multiplexed at the basic rate of 64 kbps.

A method of using the F bit 1 will be described with reference to FIG. 33. The F bit 1 is divisionally used in a manner such that a frame sync pattern (FAS) which is inserted every four frames constructs one loop of "001011", a data link m of 4 kbps which is inserted every two frames constructs one an error check code (CRC-6) on a multiframe unit which is inserted every four frames constructs one loop of $e_1$ to $e_6$, and each loop is formed by twenty-four multiframes. Namely, the F bit having the capacity of 8 kbps is time sharingly used on a 24-multiframe unit basis. The capacity of 2 kbps is assigned to the frame sync pattern, the capacity of 4 kbps is assigned to the data link, and the capacity of 2 kbps is further assigned to the error check code (CRC-6).

An example in which the asynchronous signal 3 of 1200 bps is multiplexed to the transmission frame shown in FIG. 32 will now be explained with reference to FIG. 34. The 1200 bps signal 3 which is not synchronized with the transmission clocks is sampled by the clocks of 9600 bps which are synchronized with the transmission clocks and the data 4 of 9600 bps is derived. Next, the F' bit and S' bit each consisting of one bit are added every six bits of the 9600 bps data 4 and the rate is converted into the rate which is 8/6 times as high as the 9600 bps data 4, thereby producing the data train 5 of 12.8 kbps. Eight bits consisting of the F' and S' bits and six bits surrounded by the F' and S' bits in the 12.8 kbps data train 5 are called an envelope. Thereafter, the 12.8 kbps data train 5 is multiplexed to the 64 kbps train 6 by the amount of five channels. The multiplexed data train is multiplexed to one TS having the capacity of 64 kbps in the transmission frame 7 of 1.544 Mbps.

All of the signals of the other rates are also multiplexed at the basic rate of 64 kbps in a manner similar to the above.

Since the conventional data multiplex transmission system is constructed as mentioned above, data must be all multiplexed on a 64 kbps unit basis and it is necessary to match with the transmission frame rate by performing a complicated multiplexing procedure. In addition, the conventional system is not made in consideration of the substrate line of the transmission rate of 64 kbps$\times$N (N=integer within a range of 1 to 24). If the system is applied to the subrate line by reducing the number of time slots which are used, there is a problem such that the data multiplex efficiency deteriorates or the like.

FIG. 35 shows an example of a construction of an apparatus on the transmission side when date is multiplexed as described above and shows transmitting sections of OIMUX and DOMUX extracted from "The New Data Transmission System", (2nd edition), pages 186 and 187, published by Sangyo Tosho Co., Ltd.

In the diagram, reference numeral 8 denotes a rate converting buffer to output data received from a terminal through an interface in accordance with a multiplex timing; 9 denotes a multiplex control section to multiplex the data of a plurality of channels which were stored in the rate converting buffers 8; 10 denotes a multiframe producing section to multiplex a multiframe pattern by the F' bit in the 64 kbps envelope train; 11 denotes an elastic buffer to temporarily store the multiplexed data and transmit synchronously with line clocks; and 12 denotes a frame sync pattern producing section to produce and add the F bit of the frame The terminal data of the 1200 bps signal 3 which is not synchronized with the transmission line clocks is sampled by the 9600 bps clocks synchronized with the transmission line clocks and the sampled data are stored into the rate converting buffer 8.

Next, the 9600 bps signal 4 is read out in a burst manner from the rate converting buffer 8 by the control of the multiplex control section 9. The multiplex control section 9 outputs a gate signal having the width of six bits to each rate converting buffer 8. An F' bit and S' bit which were produced by the multiframe producing section 10, are added before and after the 6-bit data read out by the gate signal. In this case, these two bits are added in response to a multiframe multiplex timing signal which is generated from the multiplex control section 9. The rate of the 8-bit data train surrounded by the F' and S' bits including these F' and S' bits is converted into the rate which is 8/6 times as high as the original data train, thereby forming the data train 5 of 12.8 kbps. The data train 5 is called an envelope. This envelope is written as a continuous envelope train into the rate converting buffer 8 at the post stage and is multiplexed.

The subsequent multiplex control section 9 sequentially outputs the multiplex gate signal of five channels. In response to the gate signals, the data train 5 of 12.8 kbps is multiplexed by the amount of five channels to form the data train 6 of 64 kbps. The data train 6 is multiplexed to one TS 2 the transmission capacity of 64 kbps and written into the elastic buffer 11. On the other hand, the transmission data input to the elastic buffer 11 is processed so that its timing is matched with that of the transmission path. Thereafter, the F bit 1 as the frame sync bit is added to the delimiter of every transmission frame of 193 bits and the resultant transmission data are sent to transmission path. A bit pattern as a 20-multiframe pattern based on the CCITT recommendation X.50 is assigned to each F' bit in the data train 6 of 64 kbps.

The signals of other rates are also multiplexed into the transmission frame at the basic rate of 64 kbps in a manner similar to the above.

An example of a construction of the rate converting buffer 8 will now be described with reference to FIG. 36.

When a write gate signal is input to a write control section 8b, a write signal to write data into a FIFO (first-in first-out) memory 8a is output the data from each channel is stored into the FIFO memory 8a by an amount of a predetermined number of bits. At the same time, a storage amount detecting section 8d starts the counting-up operation to count the number of bits written in the FIFO memory 8a. When it is detected by the storage amount detecting section 8d that the data above a predetermined number of bits has been stored in the memory 8a, a multiplex gate signal whose timing is coincident with the multiplex timing is supplied to a read control section 8c. In response to this gate signal, the read control section 8c generates a read signal to the memory 8a, so that the multiplexed data are output to the next stage.

If the storage amount detecting section 8d detects that an amount of data stored in the memory 8a is less than a predetermined value, no read signal is output. Therefore, a process is performed in a manner such that a bit slip on the output side due to a long period jitter or the like of the processing clocks at the front stage hardly occurs.

The conventional multiplex apparatus is constructed as described above due to the relation with its data multiplex format and needs two kinds of multiplex processes at different processing timings. Two rate converting buffers to smooth the data which was multiplexed in a burst manner must be cascade connected and the like. Thus, the circuit scale increases. On the other hand, in order to match the rate of data series of 1200 bps×N series with that of data series of 64 kbps, an envelope is constructed. Therefore, the ratio of the data bits which actually occupy in the time slot is below 75% (6/8 time), so that there is a problem such that the multiplex efficiency deteriorates.

FIG. 37 shows an example of a construction of an apparatus for demultiplexing on the reception side the data multiplexed as described above and shows receiving sections of OIMUX and DOMUX extracted from "The New Data Transmission System", (2 nd edition), page 186 and 187, published by Sangyo Tosho Co., Ltd. In the diagram, reference numeral 13 denotes a frame sync detecting section to search the F bit 1 in the reception data train and to establish the frame synchronization; 14 denotes an elastic buffer to temporarily store the reception data and to match the timing with that for the demultiplex process at the post stage; 15 denotes a demultiplex control section to demultiplex the multiplexed data every plurality of channels; 16 denotes a rate converting buffer to output at a constant rate the data train which was demultiplexed in a burst manner; and 17 denotes a multiframe sync detecting section to establish the multiframe synchronization by the F' bit in the envelope train of 64 kbps.

FIG. 38 is a diagram showing an example of an internal construction of the rate converting buffer 16. In the diagram, reference numeral 16a denotes an FIFO (first-in first-out) memory which can asynchronously perform the writing and reading operations; 16b denotes a write control section to output a write signal to the FIFO memory 16a in response to a demultiplex gate signal; 16c denotes a read control section to supply a data reading timing signal to the FIFO memory 16a; and 16d denotes a storage amount detecting section to detect an amount of data stored in the memory 16a.

The F bit 1 is searched by the frame sync detecting section 13 from the reception data which was output from a line terminal apparatus (DCE, DSU, etc.). When a delimiter is detected every frame, a sync established signal is output to the demultiplex control section 15. On the other hand, the reception data input to the elastic buffer 14 is processed so as to match the timing with that for the demultiplex process and thereafter, it is output as the multiplexed data to the rate converting buffer 16. The demultiplex control section 15 sequentially generates the demultiplex gate signals for only the period of time corresponding to each time slot 2. Data are written from the elastic buffer 14 into the rate converting buffer 16 in a burst manner, respectively. However, data are output as a continuous envelope train of 64 kbps from the buffer 16 to the post stage. The envelope train of 64 kbps which is output from the buffer 16 is supplied to the multiframe sync detecting section 17. The multiframe synchronization of the 20-multiframe sequence is detected by the F' bit. When the multiframe sync established signal is output from the detecting section 17, the subsequent demultiplex control section 15 sequentially generates the demultiplex gate signals of five channels, thereby controlling the writing operation into the rate converting buffer 16 as the data for each terminal. Data are also written into the buffer 16 at the last stage in a burst manner similarly to the front stage. However, data are continuously output as the data of 9600 bps which is coincident with the terminal data rate. The demultiplex gate signal for the envelope train of 64 kbps is output from the demultiplex control section 15 or only the period of time corresponding to six bits excluding the F' and S' bits. The deletion of the F' and S' bits and the demultiplex are simultaneously performed.

An example of a construction of the rate converting buffer 16 will now be explained with reference to FIG. 38. When the demultiplex gate signal is input to the write control section 16b, a write signal to write data into the FIFO memory 16a is output and the multiplexed data are stored into the memory 16a by an amount of a predetermined number of bits. At the same time, the storage amount detecting section 16d starts the counting-up operation and counts the number of bits stored in the memory 16a. When the detecting section 16d determines that the data above a predetermined number of bits has been stored in the memory 16a, a read signal is supplied to the read control section 16c. In response to the read signal, the read control section 16c outputs the continuous read signals to the memory 16a at a constant speed, so that the demultiplexed data are output to the next stage. If the detecting section 16d detects that the amount of data stored in the memory 16a is less than a predetermined value, no read signal is output. This process is performed such that a bit slip on the output side due to the long period jitter or the like of the processing clocks at the front stage hardly occurs.

Since the conventional demultiplex control apparatus of multiplexed data are constructed as described above due to the relation with its data multiplex format, it is necessary to perform two kinds of demultiplexing processes at different processing timings. Two rate converting buffers to smooth the data which was demultiplexed in a burst manner also must be cascade connected. Thus, the circuit scale increases. In addition, since an envelope is constructed in order to match the rate of data series of 1200 bps x N with that of data series of 64 kbps, the ratio of the data bits which occupy the time slot to the total number of bits in the time slot is below 75% (6/8 time) and there is a problem such that the multiplex efficiency deteriorates.

SUMMARY OF THE INVENTION:

The present invention is made to solve the foregoing problems and it is an object of the invention to provide a data multiplex transmission system which can conform with the subrate of 64 kbps x N (N=integer within a range of 1 to 24) and can keep the reliability in communication and high data multiplex efficiency and can realize processes by a simple construction.

The invention is made to solve the foregoing problems and it is an object of the invention to provide a multiplex system in which data can be multiplexed and output by use of only a single rate converting buffer and by performing once the multiplexing process, and the data multiplex efficiency is improved by adding or deleting a stuff bit to or from the multiplexed transmission frame only once for a few multiframes in accordance with necessity, and the process to add a stuff bit can be performed by a simple construction.

Further, the invention is made to solve the foregoing problems and it is an object of the invention to provide a demultiplex control system of multiplexed data in which data can be demultiplexed and output by performing a single demultiplexing process and by use of only a single rate converting buffer, the data multiplex efficiency is improved by adding or deleting a stuff bit to or from the multiplexed transmission frame only once for a few multiframes in accordance with the necessity, and the process to delete the stuff bit can be performed by a simple construction.

In a data multiplex transmission system according to the present invention, one block of the error correction code of a variable word length whose rate can be easily matched with the multiplex rate is set into one transmission frame. The multiframes of the least common multiple of the number of multiframes such that the multiplex rate which cannot be matched in one transmission frame is matched are set, thereby allowing the bit stuff reference timing to be integratedly handled. Further, transmission frame header information and control data link are provided, thereby allowing the multiplex transmission to be executed in accordance with a predetermined communication procedure.

The transmission frame which is constructed by the error correction code of a variable word length in the invention enables various kinds of multiplex rates to be integratedly processed by the multiframe structure which was set to the least common multiple of the number of multiframes whose rate can be matched with the multiplex rate. This transmission frame can also realize the advanced communication by the header information and control data link. Thus, the data multiplex transmission can be performed with a simple construction while maintaining the high efficiency and high reliability. Further, the transmission frame pull-in time is reduced by the bit error permission type pattern matching for the multiframe sync bits.

On the other hand, in the data multiplex system according to the invention, for the data train having a transmission frame format of a bit length whose rate can be easily matched with the multiplex rate, the production of the multiframe sync bits existing in each transmission frame and the multiplexing process of each data channel are integratedly performed by the same circuit. Each multiframe is further divided into submultiframes in accordance with necessity. The process to add a stuff bit is integratedly executed at the time point of the delimiter of the submultiframes for various kinds of data rates. The clock signal for interface with each terminal is phase synchronized on a submultiframe unit basis, thereby preventing the occurrence of a bit slip.

In the clock producing section for interface with a terminal in this invention, the phase synchronization of the interface clock of each rate and of the delimiter of the submultiframe is integratedly performed at the timing of the least common multiple of a plurality of different submultiframe periods for various kinds of rates of data to be multiplexed. Thus, a stuff bit can be added by the rate converting buffer of a simple construction.

Further, in the demultiplex control system of multiplexed data according to the invention, for the data train having a transmission frame format of a bit length whose rate can be easily matched with the multiplex rate, the detection of the multiframe sync bits existing in each transmission frame and the demultiplexing process of each data channel are integratedly performed by the same circuit. Each multiframe is further divided into submultiframes as necessary. The process to delete the stuff bit at the time point of the delimiter of the submultiframe is integratedly performed for various kinds of data rates. The clock signal for interface with each terminal is phase synchronized on a submultiframe unit basis.

In the clock producing section for interface with a terminal according to the invention, the phase synchronization of the interface clock of each rate and of the delimiter of the submultiframe is integratedly performed at the timing of the least common multiple of a plurality of different submultiframe periods corresponding to the rates of various kinds of multiplexed data. The stuff bit can be deleted by the rate converting buffer of a simple construction.

Therefore, according to the invention, the transmission frame length can be varied and the multiframe synchronization can be definitively established. Therefore, there are effects such that the system can sufficiently cope with any transmission rate and I/F rate and a multiplex system having a large degree of freedom can be realized by a simple construction. Further, since the error correction code, header information, control data link, etc. are provided and a predetermined communication procedure can be performed, there is an effect such that the high reliability of communication and high efficiency can be held or the like.

On the other hand, according to the invention, it is sufficient to perform only a single rate converting process and a single multiplexing process. Therefore, the circuit scale can be reduced. In association with the reduction in circuit scale, its maintenance and adjustment can be easily performed. It is also sufficient to execute the bit stuffing process on a unit basis of a few multiframes as necessary. Accordingly, there are effects such that a multiplex efficiency of 100% can be accomplished for most of the data rates and the multiplex efficiency does not deteriorate except the case of a combination of a special data rate and a special line rate.

Further, according to the invention, it is sufficient to perform a single demultiplexing process and a single rate converting process, so that there is an effect such that the circuit scale can be reduced. In association with the reduction in circuit scale, its maintenance and adjustment can be easily performed. The bit destuffing process can be performed on a unit basis of a few multiframes as necessary. Therefore, there are effects such that the multiplex efficiency of 100% can be accomplished for most data rates and multiplex efficiency does not deteriorate.

The other features and advantages of the invention will become more apparent by examining the following description of preferred embodiments of the invention. The description makes reference to the accompanying drawings.

BRIEF DESCRIPTION OF THE DRAWINGS:

FIG. 1 is a diagram showing a data transmission frame format according to an embodiment of the invention;

FIG. 2 is a diagram showing the contents of a transmission frame in FIG. 1;

FIG. 3 is a diagram showing the contents of $F_A$, H, C, and $F_B$ of the transmission frame in FIG. 1;

FIG. 10 is a time chart of each control signal in the construction of FIG. 9;

FIG. 16 is a diagram showing the operation in the case where the rate of the transmission frame and the I/F rate are matched in an example of the operation of the $CH_i$ buffer section (i=1 to n) 806 in FIG. 15;

FIG. 17 is diagram showing the operation in the case where the rate of transmission frame and the I/F rate are not matched in the example of the operation of the $CH_i$ buffer section (i=1 to n) 806 in FIG. 15;

FIG. 37, 37A and 37B are an internal constructional diagram of a conventional demultiplex control system of multiplexed data.

Figure 4:
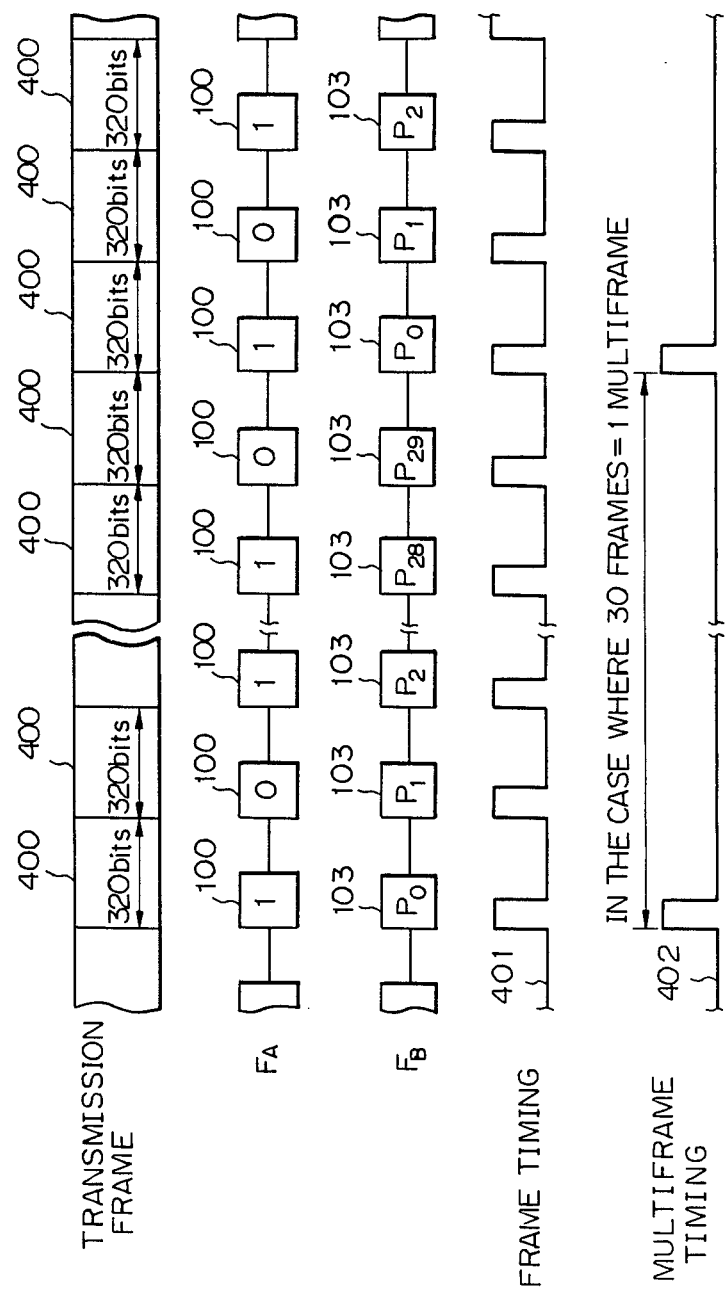
FIG. 4 is a diagram showing an example of the relations among $F_A$ and $F_B$ of the transmission frame in FIG. 1, the frame timing, and the multiframe timing.

DETAILED DESCRIPTION OF THE PREFERRED EMBODIMENTS:

An embodiment of the present invention will be described hereinbelow with reference to the drawings and with respect to an example of a frame construction of a transmission frame, as a basic frame, having the length of 320 bits whose rate can be easily matched in the case where a transmission rate is limited to 64 kbps×N (N=integer within a range of 1 to 6) for simplicity of explanation. In FIG. 1, reference numeral 100 denotes a frame sync bit $F_A$ of one bit such that an alternating pattern of "1" and "0" is inserted every frame; 101 denotes header information; 102 denotes a control data link; 103 denotes a frame sync bit $F_B$ of one bit to establish the multiframe synchronization; 104 denotes a time slot which is set every frame of each channel among n multiplex channels; and 105 denotes a check bit ECC of an error correction code such that 319 bits among 320 bits excluding one bit of the $F_A$ bit form one block of the error correction code and its length is set to 18 bits in the case of using, e. g., a (319, 302) compacted BCH code.

FIG. 2 shows the relation between the transmission frame period and the line capacity per bit in the case where the transmission rate is set to 64 kbps×N (N=integer within a range of 1 to 6) and the transmission frame length is set to 320 bits. Further, FIG. 2 also shows the relation in the case where the transmission rate is set to 56 kbps and the transmission frame length is set to 320×7/8=280 bits.

FIG. 3 shows the contents of $F_A$ 100, H 101, C 102, and $F_B$ 103 when a 30-multiframe construction was applied and a method of using those bits.

FIG. 4 shows an example of the relations among transmission frame 400, $F_A$ 100, $F_B$ 103, frame timing train 401, and multiframe timing train 402 in the case where the 30-multiframe construction was applied.

Figure 5:
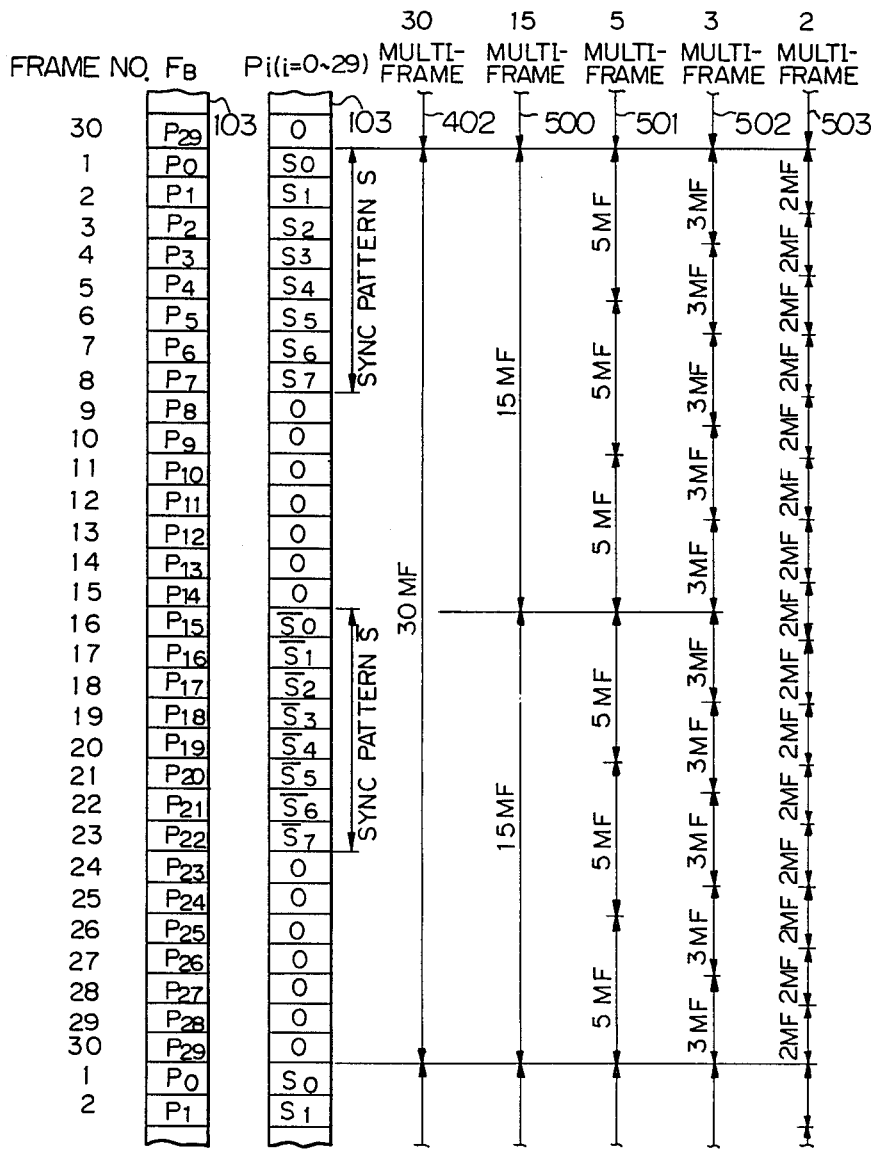
FIG. 5 is a diagram showing the relations among $F_B$ and the timings of 30 frames, 15 frames, 5 frames, 3 frames, and 2 frames in the case where the transmission frame in FIG. 1 consists of 30 multiframes.

FIG. 5 is a diagram showing an example of the relations among a content $P_i$ (i=0 to 29) 103 of the $F_B$ 103, a 30-multiframe 402, a 15-multiframe 500, a 5-multiframe 501, a 3-multiframe 502, and a 2-multiframe 503.

Figure 6:
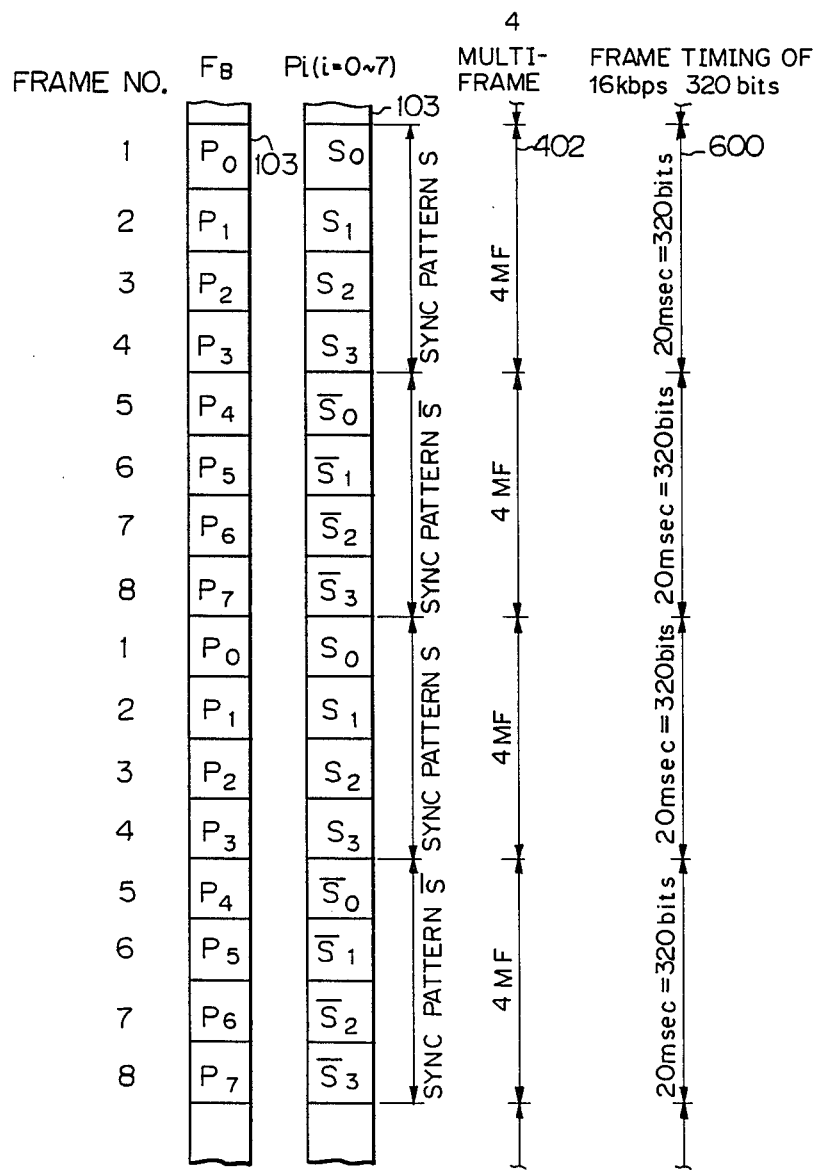
FIG. 6 is a diagram showing the relations among $F_B$, 8 multiframes, and 16 kbps 320 bits/one frame in the case where the transmission frame in FIG. 1 is applied to the line of 64 kbps and the voice data of 16 kbps 320 bits/one frame is multiplexed.

FIG. 6 is a diagram showing the relation of the multiplex matching of a voice coding data 600 in the case where the 8-multiframe construction is applied, the line of 64 kbps is used, the transmission rate is set to 16 kbps, and one frame is set to 320 bits. In the diagram, reference numeral 103 denotes a sync bit $F_B$ and its content $P_i$ (i=0 to 7); 402 denotes a delimiter of the 4-multiframe; and 600 denotes a frame timing in the case where the transmission rate is 16 kbps and one frame is set to 320 bits.

Figure 7:
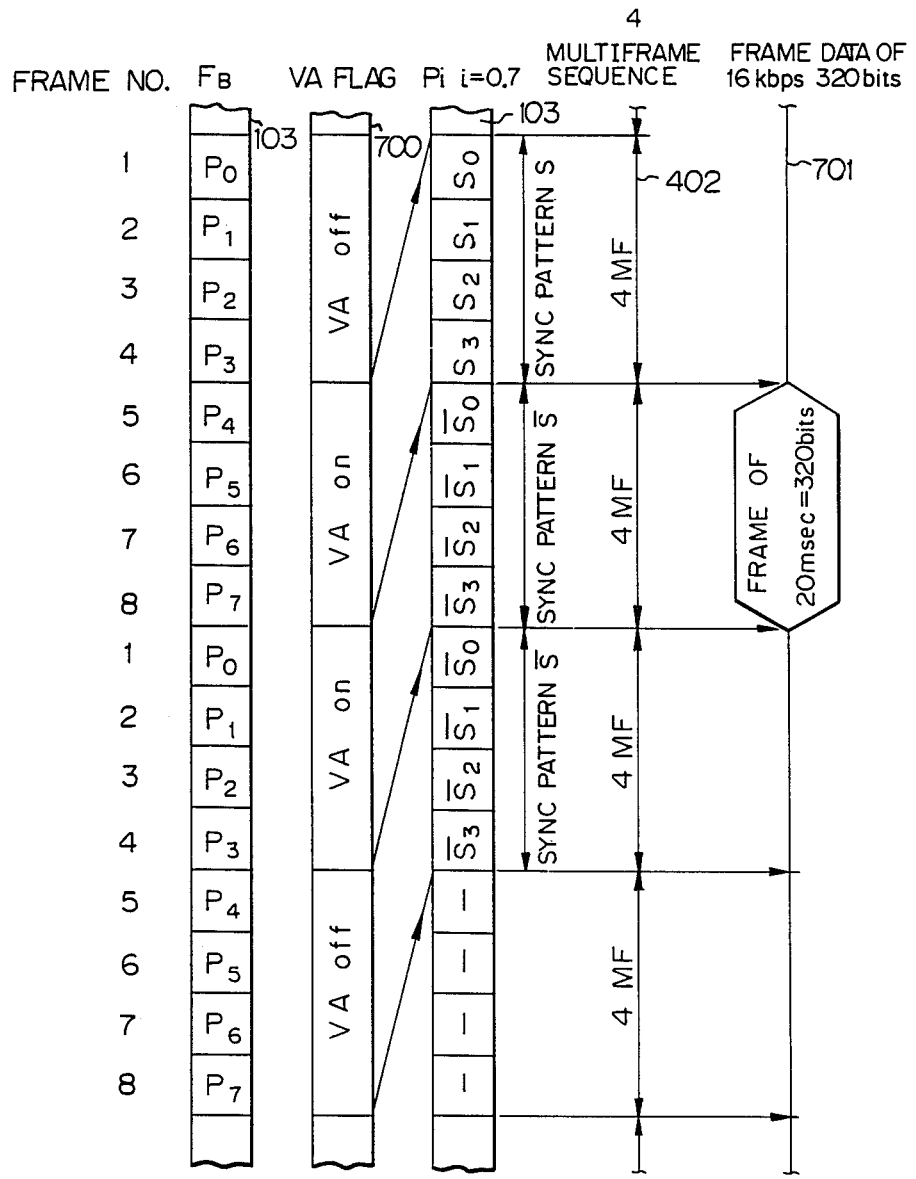
FIG. 7 is a diagram showing the relations among $F_B$, 4 multiframes, VA (voice activation) flag, and 16 kbps 320 bits/one frame in the case where the VA was further used in addition to the case of FIG. 6.

FIG. 7 is a diagram for explaining the case where a voice coding frame data 701 of 16 kbps is multiplexed and transmitted on a 320-bit (20 msec) unit basis for only a valid voice period of time, and the relevant channel is assigned to the other transmission data for the invalid period of time, and further the VA (voice activation) to multiplex is transmitted by the line of 64 kbps. In the diagram, numeral 103 denotes the multiframe sync bit $F_B$ and its content $P_i$ (i=0 to 7); 700 denotes a VA flag to indicate either one of the valid voice period of time and the invalid voice period of time: and 701 denotes the voice coding frame data of 16 kbps which is transmitted for only the valid voice period of time.

Figure 8B:
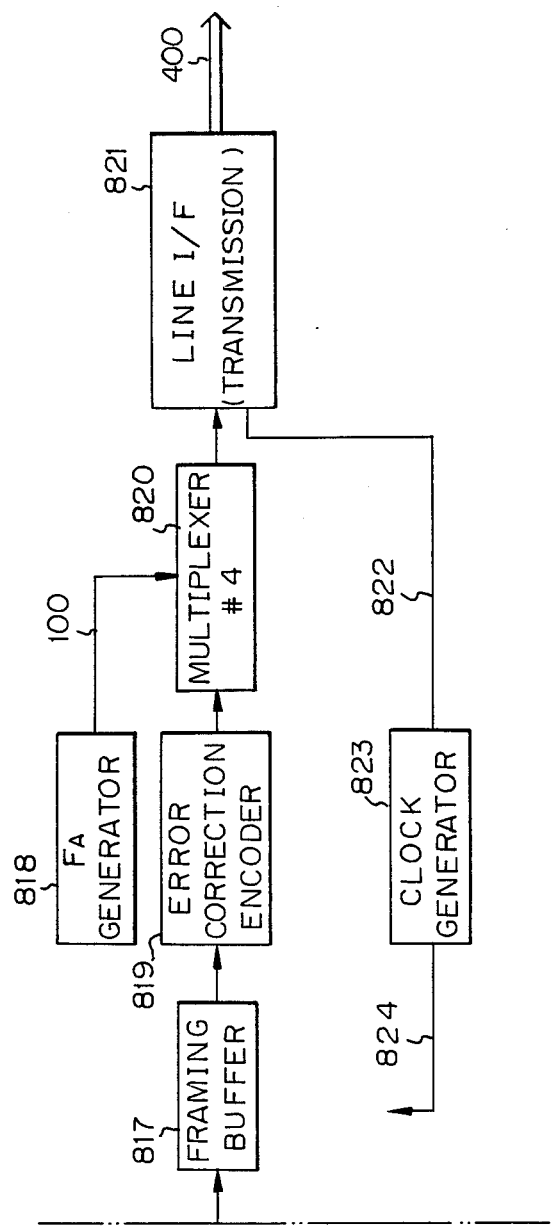
FIG. 8 is a diagram showing an example of a construction of a transmitting apparatus according to an embodiment of the invention.

FIG. 8 is a diagram showing an example of a construction of a transmitting apparatus which realizes the data multiplex transmission system according to the invention. In the diagram, reference numeral 800 denotes an H I/F section to receive the kind of header indicative of the kind of transmission frame; 801 denotes an H producing section to produce a bit pattern H 101 corresponding to the kind of header which is output from the H I/F section 800; 802 denotes a C I/F section to receive control data C 102; 803 denotes a C I/F buffer section to convert the rate of the control data into the rate of the transmission path clocks; 804 denotes an $F_B$ producing section to produce the multiframe sync bit $F_B$ 103; 805 denotes a $CH_i$ I/F section to receive each data $CH_i$ (i=integer within a range of 1 to n) 104 from $CH_1$ to $CH_n$; 806 denotes a $CH_i$ buffer section to convert the rate of the transmission data from the $CH_i$ I/F section 805 into the rate of the transmission path clocks; 807 denotes a multiplexing section #1 to multiplex the H 101, C 102, and $F_B$ 103 with a predetermined frame format; 808 denotes a multiplexing section #2 to multiplex the $CH_i$ 104 with a predetermined frame format; 809 denotes a training pattern producing section to generate a training pattern 814 at the time of the pull-in; 810 denotes an output of the multiplexing section #1 807; 811 denotes a multiplex control section to control multiplexing section #1 807 and multiplexing section #2 808; 812 denotes an output of the multiplexing section #2 808; 813 denotes a selector to select the output the multiplex section #2 or the training sequence 814; 815 denotes an output selector 813; 816 denotes a multiplexing section #3 to multiplex the output 810 of the multiplexing section #1 and the output of the selector 813 and construct a frame excluding the $F_A$ 100 and ECC 105; 817 denotes a framing buffer to match the processing timing for the multiplexing section #3 816; 819 denotes an error correction coding section to error correction code the output of the framing buffer 817 and multiplex the ECC 105; 818 denotes an $F_A$ producing section to produce the frame syno bit $F_A$ 100; 820 denotes a multiplexing section #4 to multiplex the output of the error correction coding section 819 with the $F_A$ 100 and construct a transmission frame 400; 821 denotes a line I/F section; 822 denotes a transmission path clocks which are supplied from the line I/F section 821; and 823 denotes a clock producing section to produce various kinds of clocks 824 necessary for the processes on the basis of the transmission path clocks 822.

Figure 9:
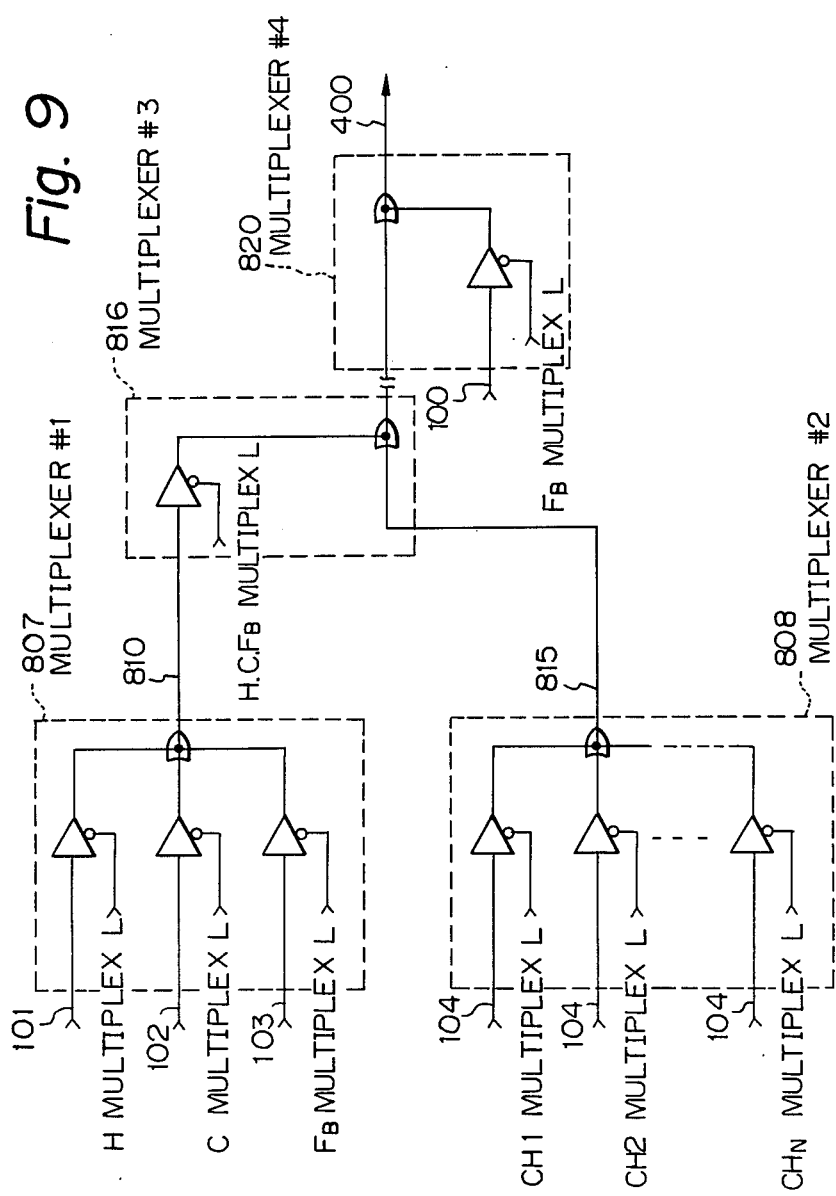
FIG. 9 is a diagram showing the concept of a construction of each multiplex system in FIG. 8.

FIG. 9 is a diagram showing the concept of constructions of the multiplexing sections #1 807, #2 808, #3 816, and #4 820 in FIG. 8. FIG. 10 is a timing diagram showing each control signal in the conceptional constructional diagram of FIG. 9.

Figure 11B:
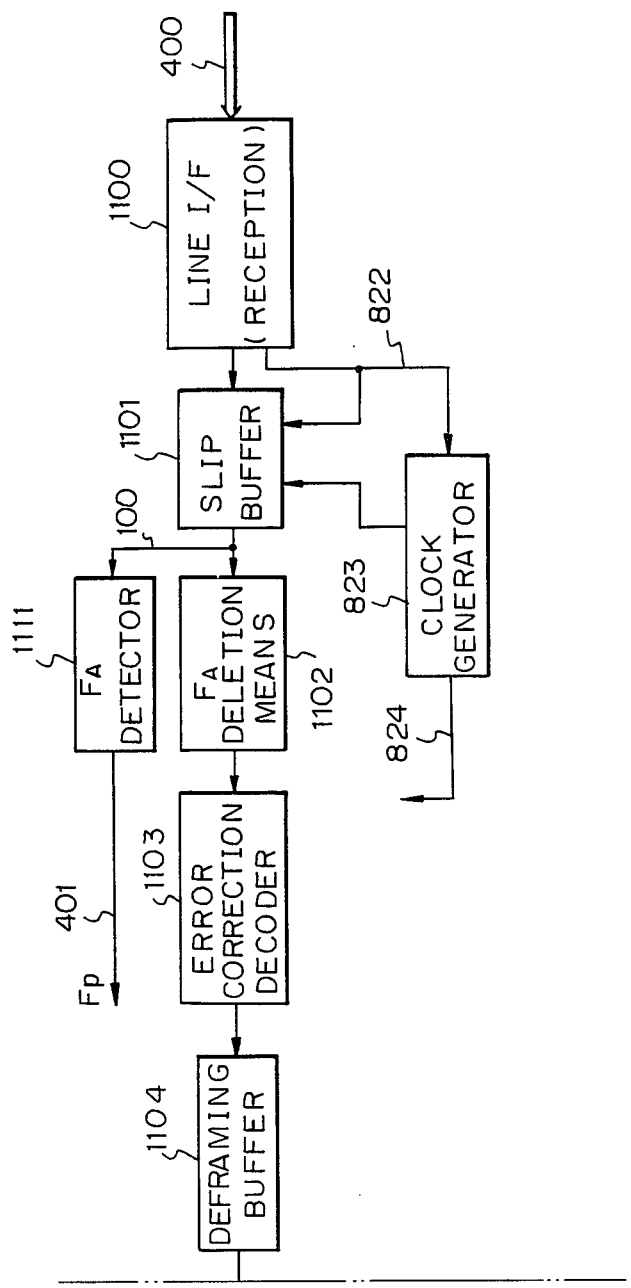
FIG. 11 is a diagram showing an example of a construction of a receiving apparatus according to an embodiment of the invention.

FIG. 11 is a diagram showing an example of a construction of a receiving apparatus similar to FIG. 8. In the diagram, reference numeral 1100 denotes a line I/F section to receive the transmission frame 400; 1101 denotes a slip buffer to smooth the timing jitter of the received transmission frame 400; 1111 denotes an $F_A$ detecting section to check an output of the slip buffer 1101 and establish the transmission frame synchronization on the basis of the transmission frame sync bit 100; 401 denotes a transmission frame timing train $F_p$ which is output from the $F_A$ detecting section; 1102 denotes an $F_A$ deleting section to delete the $F_A$ bit 100 in the transmission frame 400; 1103 denotes an error correction decoding section to perform the error correction decoding on the basis of the ECC 105 in the transmission frame 400 and correct errors on the transmission path; 1104 denotes a deframing buffer to match the processing timing for a demultiplexing section #1 1105; 1105 denotes the demultiplexing section #1 to demultiplex an output of the deframing buffer 1104 into the portion of H 101, C 102, $F_B$ 103 and the portion of $CH_i$ (i=1 to n) 104; 1106 denotes a demultiplexing section #2 to demultiplex the H 101, C 102, and $F_B$ 103 with a predetermined frame format; 1107 denotes a demultiplex control section to control the demultiplexing process; 1108 denotes a demultiplexing section #3 to demultiplex the $CH_i$ (i=1 to n) 104; 1112 denotes a gate to delete the training sequence which is indicated by the header information H 101; 801 denotes an H deciding section to decode the H 101 and discriminate the kind of transmission frame; 800 denotes the H I/F section to output the result of the discrimination of the transmission frame from the H deciding section 801; 803 denotes the C I/F buffer section to convert the rate of the control data C 102 from the rate of the transmission path clocks to the rate of the I/F clocks; 802 denotes the C I/F section to output the control data C 102; 1109 denotes an $F_B$ detecting section to check the $F_B$ 103 and establish the multiframe synchronization; 1110 denotes an $MF_p$ producing section to produce the delimiter timings of, e.g., two, three, and five frames on the basis of the multiframe sync timing from the $F_B$ detecting section 1109; 806 denotes the $CH_i$ (i=1 to n) buffer sections to convert the rate of the $CH_i$ (i=1 to n) 104 from the rate of the transmission path clocks to the rate of the I/F clocks; 805 denotes the $CH_i$ (i=1 to n) I/F section to output the $CH_i$ (i=1 to n) 104; and 823 denotes the clock producing produce various kinds of timings 824 necessary for the processes on the basis of the transmission path clocks 822 which are supplied from the line I/F section.

Figure 12:
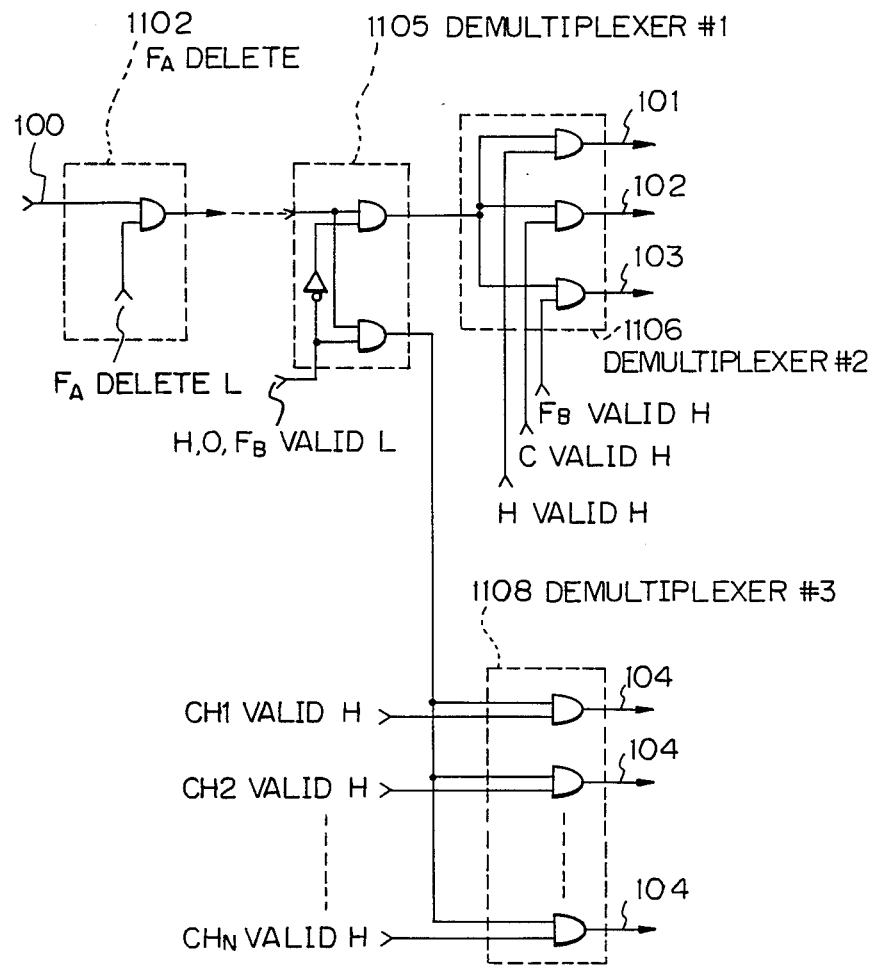
FIG. 12 is a diagram showing the concept of a construction of each demultiplex system in FIG. 11.
Figure 13:
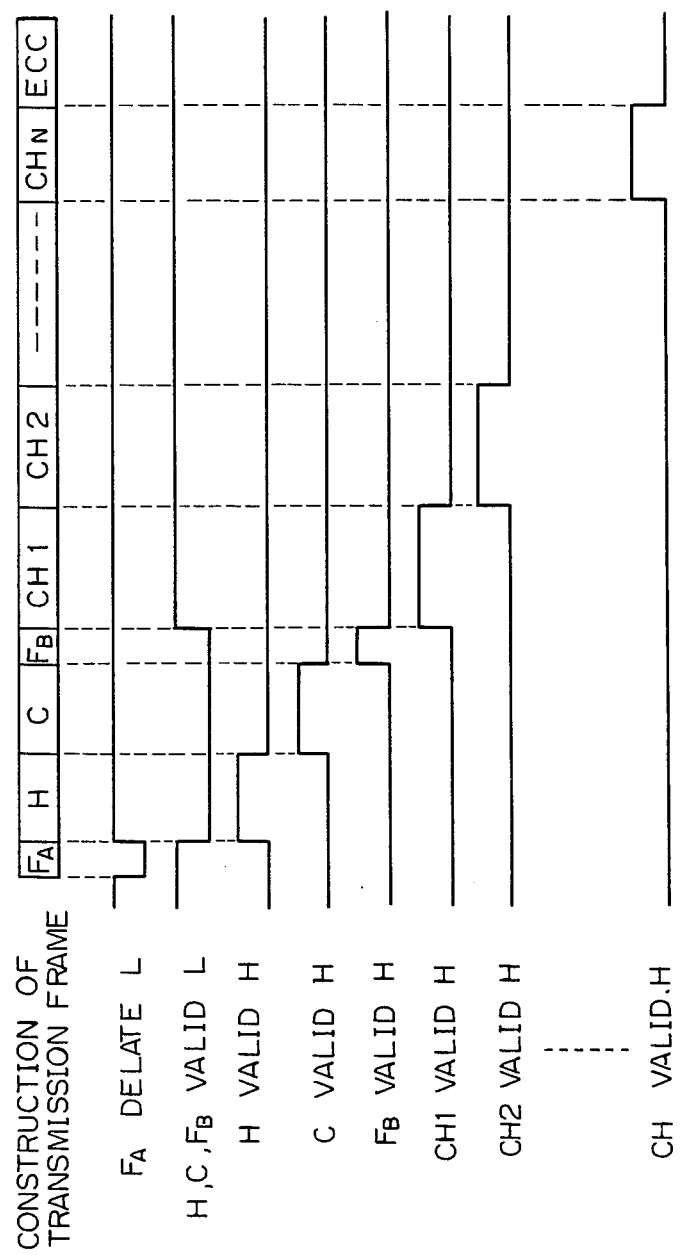
FIG. 13 is a time chart of each control signal in the construction of FIG. 12.

FIG. 12 is a diagram showing the concept of constructions of the $F_A$ deleting section 1102 and demultiplexing sections #1 1105, #2 1106, and #3 1108 in FIG. 11. FIG. 13 is a diagram showing a timing control signal in the conceptional constructional diagram of FIG. 12.

Figure 14:
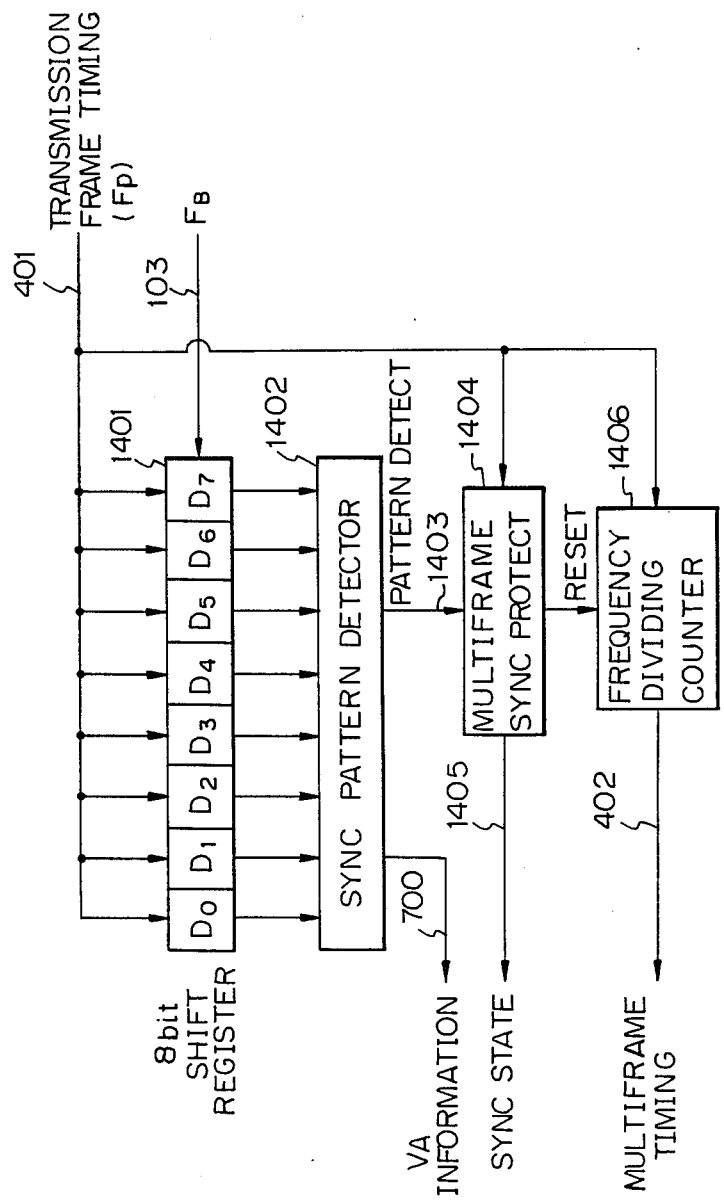
FIG. 14 is a diagram showing an example of a construction of an $F_B$ detecting section 1109 in FIG. 11.

FIG. 14 is a diagram showing an example of a construction of the $F_B$ detecting section 1109 in FIG. 11. In the diagram, reference numeral 401 denotes a transmission frame timing $F_p$; 1401 denotes a shift register of eight bits; 103 denotes the multiframe sync bit $F_B$; 1402 denotes a sync pattern detecting section to detect a sync pattern $S_i$ (i=0 to 7); 1403 denotes a sync pattern detection pulse; 1404 denotes a multiframe sync protecting section; 1406 denotes a frequency dividing counter to produce delimiter timings for, e.g., two, three, and five frames; 700 denotes the result of the VA detection in the case of performing the VA (voice activation); 1405 denotes a sync state signal indicative of whether the synchronization has been established or not; and 402 denotes the multiframe timing indicative of delimiter timings for, e.g., two., three, and five frames.

Figure 15:
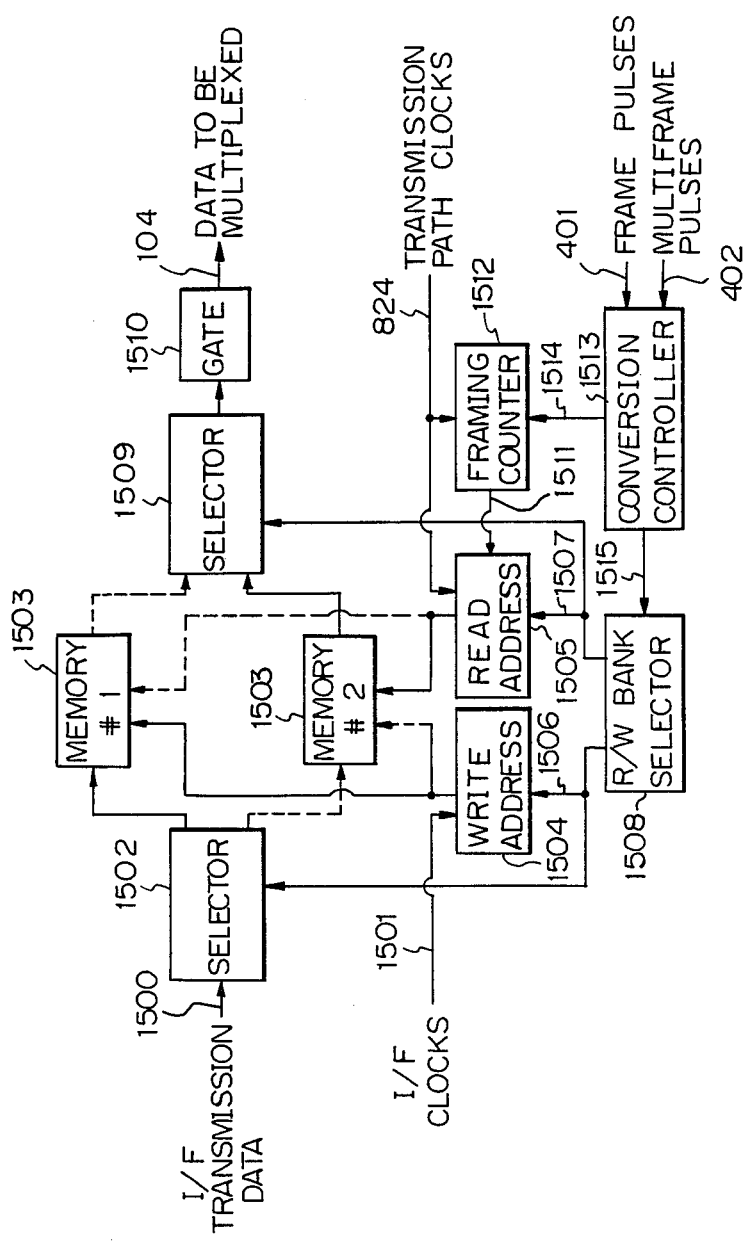
FIG. 15 is a diagram showing an example of a construction of a $CH_i$ buffer section (i=1 to n) 806 in FIG. 8.

FIG. 15 is a diagram showing an example of a construction of the $CH_i$ buffer section (i=1 to n) 806 shown in FIG. 8. In the diagram, reference numeral 1500 denotes an I/F transmission data which is input synchronously with I/F clocks 1501; 1502 denotes a selector to select the writing areas of double memories 1503 which are constructed by two areas and simultaneously perform the reading and writing operations; 1504 denotes a write address counter of the double memories 1503; 1505 denotes a read address counter of the double memories 1503; 1506 denotes a write selection signal which is output from an R/W bank selecting section 1508; 1507 denotes a read selection signal which is output from the R/W bank selecting section 1508; 1508 denotes the R/W bank selecting section to control the reading and writing operations of the double memories 1503 on the basis of a rate conversion timing signal 1515 which is output from a conversion control section 1513; 1509 denotes a selector to select the reading operations of the double memories 1503; 1510 denotes a gate; 1511 denotes a counting clock of the read address counter 1505; 1512 denotes a framing counter to count the number of bits which are multiplexed to one transmission frame; 1513 denotes the conversion control section to control the rate conversion in accordance with a frame format on the basis of the frame pulses 401 and multiframe pulses 402; 824 denotes transmission path clocks: and 104 denotes data $CH_i$ (i=1 to n) to be multiplexed which is sent synchronously with transmission path clocks 824.

FIG. 16 is a diagram showing an example of the operation in the case where the rate of one transmission frame is matched with the rate of the data $CH_i$ (i=1 to n) in the example of the rate converting operation of $CH_i$ buffer section in FIG. 15. In the diagram, reference numeral 401 denotes a transmission frame timing; 1500 denotes the transmission I/F data before the conversion which is synchronized with the I/F clocks: and 104 denotes the transmission I/F data after the rate conversion which is synchronized with the transmission path clocks and is output on a frame unit basis.

FIG. 17 is a diagram showing an example of the rate converting operation in the case where the transmission rate is not matched with the rate of one transmission frame but is matched with the rate of two transmission frames in the example of the operation of the $CH_i$ buffer section in FIG. 11 in a manner similar to the case of FIG. 16. In the diagram, reference numeral 503 denotes a multiframe timing indicative of a delimiter on a two-frame unit basis; 1500 denotes the transmission I/F data before conversion; 104 denotes valid data which is multiplexed to one frame; and 1700 denotes valid data in one frame including a stuff bit 1701.

The operation will now be explained. First, in FIG. 1, a transmission frame frequency $f_F$ in the case where the transmission frame length is set to 320 bits is obtained by the following equation:

$f_F = T_s/320$ [Hz]

$T_s$: transmission rate [bps].

Therefore, the capacity C which is assigned to one bit in one transmission frame will be:

$$C = f_F \times 1 \text{ bit} = f_F \text{ [bps]}.$$

FIG. 2 shows the results of the transmission frame periods corresponding to the transmission rates of 64 kbps×N (N=1 to 6) and of each capacity which is assign to one bit frame which was calculated by the above equations. In the case of 56 kbps, however, one frame is set to 280 bits because of the reasons which will be explained hereinbelow.

From FIG. 2, in the cases of the transmission rates of 64 kbps×N (N=1 to 6), the capacity which is assigned to one bit/one frame becomes 200×N (N=1 to 6) [bps]. In the case of multiplexing the I/F rate of 1200, 2400, 4800, 7200, or 9600 [bps], which is generally used, the rate matching can be relatively easily accomplished. However, in the case of 56 kbps, since the transmission rate is 7/8 time slower than 64 kbps, it is difficult to match the transmission rate. Therefore, the transmission frame length is set to, e.g., 320×7/8=280 bits and $f_F$ is set to 200 [Hz], thereby enabling the transmission rate to be matched.

Thus, the number $l_i$ of bits which are multiplexed to the $CH_i$ is given by the following equation:

$$l_i = TI/F/f_F \text{ [bits/frame]}$$

TI/F : I/F rate [bps].

However, the value of $l_i$ is not an integer. There is also a case where the ratio between the I/F rate and the transmission rate becomes an integer on a unit basis of two frames, three frames, five frames, or the Like. In such a case, fixed time slots are assigned to one transmission frame and as many dummy bits (stuff bits) as there are surplus bits are inserted on a multiframe unit basis at which the rate matching can be obtained, thereby matching the rate on a transmission frame unit basis. For example, in the case where the I/F rate is 1200 bps and the transmission rate is 256 kbps, the rate is matched by two frames. The number of time slots which are assigned is two bits per frame. The number of valid data bits is three per two frames. The number of stuff bits is one per two bits.

Further, the unit of the multiframe synchronization differs for every I/F rate. When the transmission rate is set into a variable value of 64 kbps×N (N=1 to 6), if the I/F rate is set to 1200, 2400, 4800, 7200, or 9600 bps, the units of the multiframe synchronization are limited to one of two, three, and five frames with respect to the transmission rates of 48 kbps and 64 kbps. Therefore, if the number of frames to establish the multiframe synchronization is set to 30 which is the least common multiple of 2, 3, and 5, the multiframe synchronization can be integratedly handled. However, when considering the reliability and pull-in time, it is undesirable to establish the multiframe synchronization by use of the transmission frame synchronization. Therefore, the multiframe synchronization is established by setting the number of bits independently of the transmission frame sync bits and by use of the bit pattern matching system. For example, one bit of the bit pattern of eight bits is multiplexed every frame. The fixed "0" bit is multiplexed to the next seven frames. In this manner, the 15-multiframe is discriminated. Further, the bits of the bit pattern of the first eight frames of the next 15-multiframe are inverted. The fixed "0" bit is again multiplexed to the remaining seven frames. By alternating the bit patterns, the 30-multiframe is discriminated. For example, if the 8-bit Barker code is used for the 8-bit bit pattern, the matching of the sync pattern can be obtained while allowing an error of up to one bit, so that the pulling can be promptly performed.

As described above, in FIG. 1, if the kind of I/F data to be multiplexed or the like is variable, the multiplexing mode or the like needs to be set by use of the data link at the start of the communication. For these applications, the fixed control data link C 102 is provided. Further, in order to complete the pull-in for a short time, only the training sequence consisting of the fixed bit pattern is multiplexed and transmitted at the time of pull-in. Therefore, the header information H 101 indicative of the kind of training sequence frame or ordinary transmission frame is provided and the multiframe sync bit $F_B$ 103 is provided. It is desirable to set the number of transmission frame sync bits to a value as small as possible in order to raise the multiplex efficiency. Therefore, one bit is assigned and the alternating pattern of "1" and "0" is used to prevent the erroneous pull-in. Further, the error correction code ECC 105 is used to keep the high communication quality. If, for example, the compacted (319, 301) BCH code of the (511, 493) 2-bit error correction BCH code is used as the ECC 105, the check bits of 18 bits are multiplexed into the transmission frame.

Therefore, the use efficiency $\eta$ of the transmission capacity which is assigned to the $CH_i$ (i=1 to n) is obtained by $$\eta = 300 - k/320 \times 100 \text{ [\%]}.$$

when k=5 bits, the value of $\eta$ is about 92%.

FIGS. 3, 4, and 5 show the relations among $F_A$ 100, H 101, C 102, $F_B$ 103, and the multiframe.

Next, there is assumed the case of multiplexing voice coding data such as to obtain a construction of 16 kbps and 320 bits=1 frame when the transmission rate is 64 kbps. In FIG. 6, frame timing of 320 bits of the voice data 600 needs to be supplied from the multiplexing section, the 8-bit pattern of the $F_B$ 103 is converted into the 4-bit pattern and the bit pattern is alternated every four bits, and the 4-multiframe sequence 402 is discriminated. If the voice frame 600 of 320 bits is divided into four small frames in one transmission frame on an 80-bit unit basis and multiplexed, the rate matching between the voice frame timing of 320 bits and the transmission frame can be accomplished. For the bit pattern of four bits of the $F_B$ 103, for example, by use of the alternating pattern of "1110" and "0001", the pattern matching can be performed while allowing an error of up to one bit.

Further, in FIG. 7, in the case of performing the VA (voice activation) such that the voice coding data 701 of 320 bits is multiplexed for only the valid voice period of time and the other data are multiplexed for the invalid voice period of time, the presence or absence of the voice data can be discriminated by checking whether the 4-bit pattern of the $F_B$ 103 is inverted or not. However, on the reception side, since this discrimination can be performed only after the four frames were received, the information indicative of the inversion or noninversion of the $F_B$ 103 to discriminate the presence or absence of the voice data are multiplexed at the timing which is preceding by one period with respect to the discrimination period (on a frame unit of 320 bits of 16 kbps) of the VA flag 700, i.e., by four frames with regard to the transmission frame of 64 kbps.

The operation in an example of a construction of a transmitting apparatus based on the data multiplex transmission system according to the invention will now be described with reference to FIG. 8. First, the data indicative of the kind of transmission frame is input from the H I/F section 800. The header information H 101 corresponding to this kind is output from the H producing section 801 synchronously with the transmission path clocks 822. Next, the control data C 102 is input from the C I/F section 802 and its rate is converted into the rate of the clocks 822 and output from the C I/F buffer 803. On the other hand, the $F_B$ 103 is output from the $F_B$ producing section 804 synchronously with the multiframe timing in accordance with the set multiframe sequence. These H 101, C 102, and $F_B$ 103 are multiplexed by the multiplexing section #1 807 and sent to the multiplexing section #3 synchronously the clocks 822.

On the other hand, the $CH_i$ (i=1 to n) 104 is input from the $CH_i$ I/F section 805 in correspondence to each I/F rate and its rate is converted on a transmission frame unit basis by the $CH_i$ buffer section (i=1 to n) 806 synchronously with the clocks 822. Further a stuff bit is inserted into some of the rate converted data on a multiframe unit basis in order to obtain the rate matching with the transmission frame 400. Then, the resultant data are multiplexed by the multiplexing section #2 808.

At the time of the pull-in of the transmission frame synchronization, the selector 813 selects the training pattern 814 which is generated from the training pattern producing section 809. In the ordinary communication, the selector 813 selects the output 812 of the multiplexing section #2 808.

The output 810 of the multiplexing section #1 807 and the output 815 of the selector 813 are multiplexed by the multiplexing section #3 816 and the processing timing is matched in the framing buffer 817. After the ECC 105 was added to the transmission data read out of the framing buffer 817 by the error correction coding section 819, the frame sync bit $F_A$ 100 generated from the $F_A$ producing section 818 is multiplexed to the transmission data by the multiplexing section #4 820, thereby forming the transmission frame 400. Thereafter, this transmission frame is sent to the line via the line I/F section 821. The clock producing section 823 produces various kinds of clocks 824 such as transmission frame timing, multiframe timing, and the like on the basis of the transmission path clocks 822 which are supplied from the line I/F section 821. These clocks are distributed to each section.

The multiplex control section 811 controls the multiplexing processes of the multiplexing sections #1 807, #2 808, and 816 and sets a transmission frame format.

FIG. 9 shows a conceptional construction of the multiplexing sections #1 to #4. In the diagram, reference numerals 100 to 104 denote data signal lines. The data are output from the buffers 803 and 806 and producing sections 801, 804, and 818 only for the period of time when the enable signal of each gate is set to the "L" level. These data are sequentially multiplexed.

Read signals are independently supplied to the buffers and producing sections.

As shown in FIG. 10, the control signal of each gate is set to the "L" level at the data slot position corresponding to the transmission frame construction, respectively.

The receiving operation will be described with reference to FIG. 11 in a manner similar to FIG. 8. The transmission frame 400 sent from the line passes through the line I/F section 1100 and the reception timing jitter is first smoothed by the slip buffer section 1101, so that the bit slip is suppressed. Next, the $F_A$ 100 is checked by the $F_A$ detecting section 1111. The transmission frame synchronization is established. The transmission frame pulse $F_p$ 401 is produced. Next, the $F_A$ 100 in the transmission frame is deleted by the $F_A$ deleting section 1102. The error correction decoding process is performed on a transmission frame unit on the basis of the ECC 105 by the error correction decoding section 1103. The resultant data are stored into the deframing buffer 1104. On the basis of the transmission frame format shown in the demultiplex control section 1107 by the deframing buffer 1104, the demultiplex section #1 1105 first demultiplexes the transmission frame into two portions: i.e., the portion consisting of H 101, C 102, and $F_B$ 103; and the portion of $CH_i$ (i=1 to n) 104. The former portion is sent to the demultiplexing section #2 1106. The latter portion is sent to the demultiplexing section #3 1108. The H 101, C 102, and $F_B$ 103 are demultibuted to the H deciding section #2 1106 and are distributed to the H deciding section 801, C I/F buffer section 803, and $F_B$ detecting section 1109. The H deciding section 801 interprets the header information and discriminates whether or not the transmission frame includes the training sequence. The result of the discrimination is sent to the gate 1112. The gate 1112 has the function to delete the training sequence frame and to allow the other to pass the demultiplexing section #3. The $F_B$ detecting section 1109 checks the pattern of the multiframe sync bit $F_B$ 103 and detects the delimiter of the multiframe synchronization. Various kinds of multiframe timings are produced in the $M_{Fp}$ producing section 1110. On t he other hand, the demultiplexing section #3 demultiplexes the $CH_i$ (i=1 to n) 104. In accordance with the procedure opposite that in the transmission mode, the $CH_i$ 104 is rate converted by the $CH_i$ buffer section (i=1 to n) 806 from the rate of the transmission path clocks to the rate of the I/F clocks on a transmission frame unit basis or on a multiframe unit basis. Further, a stuff bit is deleted from some of the data. The resultant data are output to each I/F section via the $CH_i$ I/F section (i=1 to n) 805.

FIG. 12 shows a conceptual construction of the $F_A$ deleting section and demultiplexing sections #1 to #3. In the diagram, reference numerals 100 to 104 denote data lines. These data lines are set to the "L" level for the period of time when each data are invalid and are individually connected to the buffers 803, 806, and the like.

Write signals are independently supplied to the buffers.

As shown in FIG. 13, each control signal changes to the "L" or "H" level at the corresponding data position in the transmission frame construction.

The operation of the $F_B$ detecting section 1109 will now be described with reference to FIG. 14. The multiframe sync bit $F_B$ 103 is input one bit by one to the shift register 1401 of eight bits at the transmission frame timing $F_p$ 401. The sync pattern detecting section 1402 allows a bit error every transmission frame timing $F_p$ 401 and compares with a predetermined sync pattern $S_i$ (i=0 to 7). When those patterns coincide, the pattern detection pulses 1403 are sent. On the other hand, in the case of using the VA information 700, it is also output.

Next, the pattern detection pulses 1403 are continuously input at the same position by the multiframe sync protecting section 1404. When the number of pulses reaches a predetermined number, it is decided that the synchronization is established. The sync state signal 1405 is output. Next, the transmission frame timing $F_p$ is frequency divided into, e.g., ½, ⅓, and 1/5 by the frequency dividing counter 1406. The counter 1406 is reset each time the sync pattern is detected. In this manner, the multiframe timing 402 as a delimiter timing of the two, three, and five frames is produced.

The operation of the $CH_i$ buffer 806 will now be described with reference to FIG. 15. The I/F transmission data 1500 is stored into one area of the double memories 1503 which is selected by the selector 1502 in accordance with the address indicated by the write address counter 1504 synchronously with the I/F clocks 1501. After completion of the storage of the bits of the number corresponding to the rate converting unit of one transmission frame or multiframe, the reading side is selected by the selector 1509. The data 104 to be multiplexed is output synchronously with the transmission path clocks via the gate 1510 for every bits which is assigned to the channel which was set for the transmission frame. The other one area of the double memories 1503 oppositely performs the reading and writing operations and apparently simultaneously executes the reading and writing operations. The conversion control section 1513 outputs the switching signal 1515 on a conversion unit basis of every frame pulse 401 or multiframe pulse 402. The R/W bank selecting section 1508 sends the read selection signal 1507 and write selection signal 1506 in response to the switching signal 1515.

When the transmission frame rate is matched with the I/F rate, the conversion is performed on a transmission frame unit basis. The double memories 1503 are also switched on a transmission frame unit basis. The number of bits which are stored into the double memory 1503 coincides with the number of time slots of the relevant channel which were assigned to the transmission frame. This example is shown in FIG. 16.

When the transmission frame rate is not matched with the I/F rate, the conversion is performed on a multiframe unit basis at which the rate matching can be obtained. The double memories 1503 are also switched on a multiframe unit basis. Data are read out of the double memories 1503 every transmission frame for every period of time corresponding to the time slots assigned to one frame. However, since the number of time slots assigned is set to a fixed value on a transmission frame unit basis, the number of bits to be read is larger than the number of bits written. A number of dummy bits corresponding to the difference between the number of bits to be read-out and the number of bits to be written-in are inserted, thereby performing the rate matching on a transmission frame unit basis. Therefore, the number of bits which are written into the double memories 1503 coincides with the number of valid bits which are written on a multiframe unit basis. FIG. 17 shows an example of the converting operation in the case where the rate matching is obtained by the two multiframes. The number $l_i$ of time slots assigned on a transmission frame unit is given by:

$$l_i = \left[ \frac{T \cdot I/F}{f_F} \right] + 1 \text{ [bits]}$$

[ ] denotes a Gaussian symbol and [a] indicates the maximum integer which does not exceed a.

The number q of stuff bits is given by:

$$q = M_F \times l_i - r \text{ [bits/multiframe]}$$

When the number of multiframes is set to $M_F$.

r: number of valid bits of a multiframe unit given by:

$$r = T \cdot I/F \times M_F/f_F \text{ [bits/multiframe]}$$

The value of $M_F$ is selected so that r is set to an integer.

If the foregoing values can be variably set for various kinds of I/F rates by setting and confirming each other through the C 102 when the communication is started, a number of kinds of terminals can be enclosed in the present system.

In the foregoing embodiment, the header information H 101 has been used only to discriminate whether or not it indicates the training sequence frame. It is also possible to use a system in which a plurality of kinds of transmission frame formats are prepared and switched by the header information H 101 or the like.

In addition, although the control data C 102 has been used only to set the transmission frame format in the foregoing embodiment, it can be also used for transmission of other system data or the like. In such a case, the effects similar to those in the foregoing embodiment can be also obtained.

More practical constructions of the data multiplex control system in the transmitting apparatus shown in FIG. 8 and of the demultiplex control system in the receiving apparatus shown in FIG. 11 will now be described with respect to embodiments.

Figure 18B:
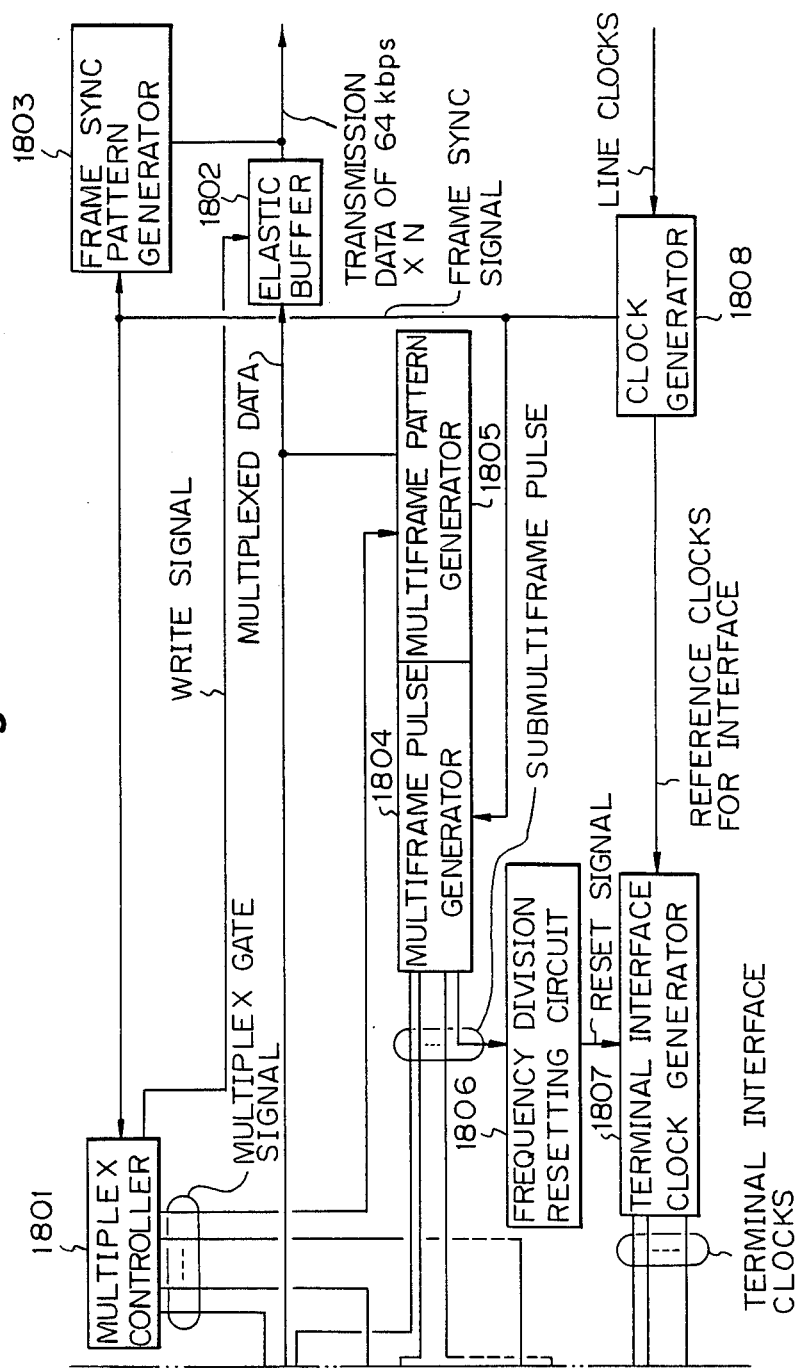
FIG. 18 is an internal constructional diagram of a data multiplex control system according to an embodiment of the invention.

FIG. 18 shows an example of a construction in the case where the terminal interface data are multiplexed to the data train having the transmission frame format shown in FIGS. 1 and 2. In the diagram, reference numeral 1800 denotes the rate converting buffer to store each terminal interface data; 1801 denotes the multiplex control section to multiplex the data obtained from a terminal via the interface by a predetermined number of bits at a time; 1802 denotes the elastic buffer to temporarily store the multiplexed transmission data; 1803 denotes the frame sync pattern producing section to produce and add the $F_A$ bit 100 in the transmission frame; 1805 denotes the multiframe pattern producing section to produce the $F_B$ bit pattern in the transmission frame; 1804 denotes the multiframe pulse producing section to produce multiframe pulses corresponding to the multiframe established by the $F_B$ bit train and a signal to further divide the multiframe into submultiframes; 1808 denotes the clock producing section to smooth the jitter component of the clocks for transmission including a jitter from the transmission path and to produce reference clocks for interface having a constant synchronizing relation with those clocks for transmission and a frame sync signal; 1807 denotes the terminal interface clock producing section to frequency divide the reference clocks for interface and to produce interface clocks of various kinds of rates; and 1806 denotes the frequency division resetting circuit to initialize the terminal interface clock producing section 1807 at the period of the small multiframes.

Figure 19:
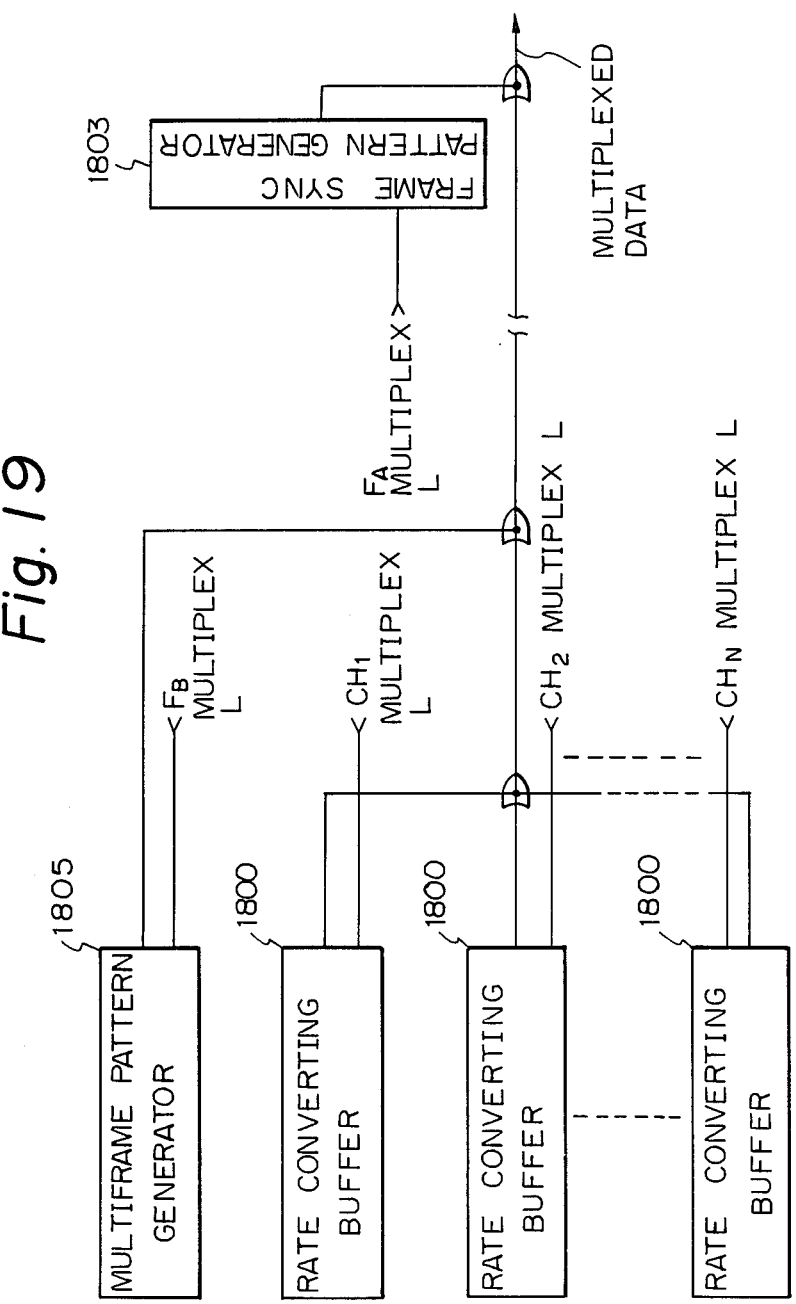
FIG. 19 is a diagram showing the concept of a construction of a multiplex system in FIG. 18.

FIG. 19 is a diagram showing the concept of multiplex in FIG. 18.

Figure 36:
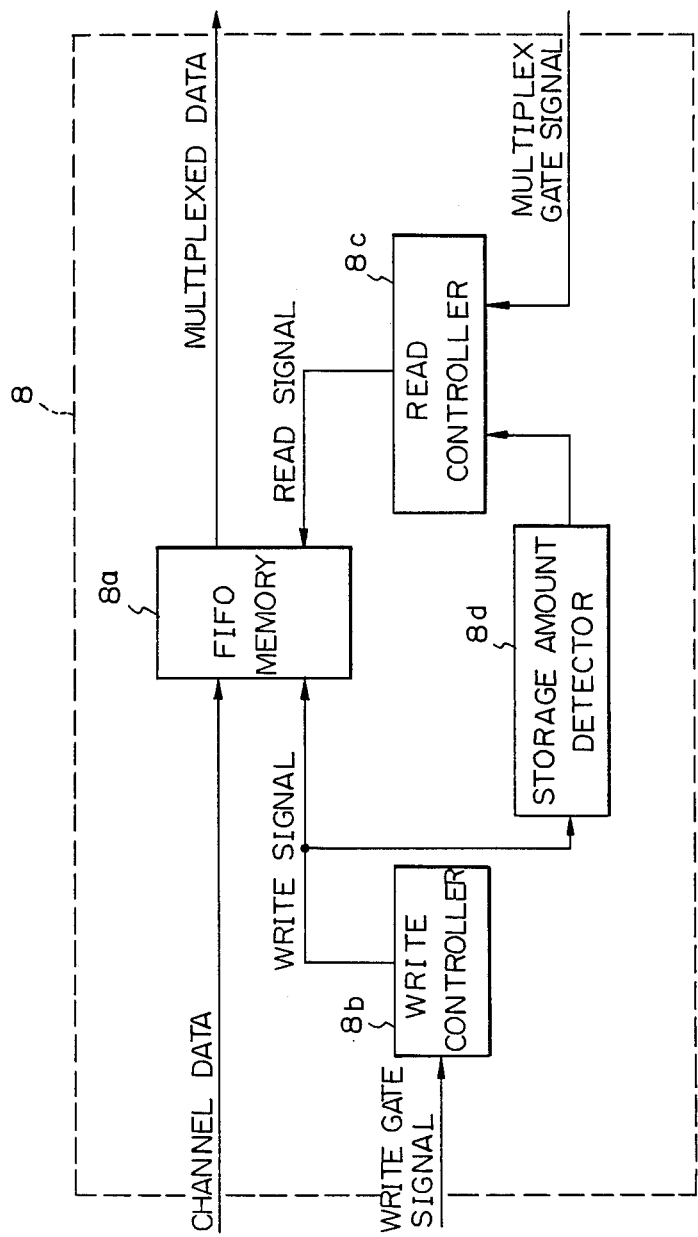
FIG. 36 is a constructional diagram of a conventional rate converting buffer.
Figure 37B:
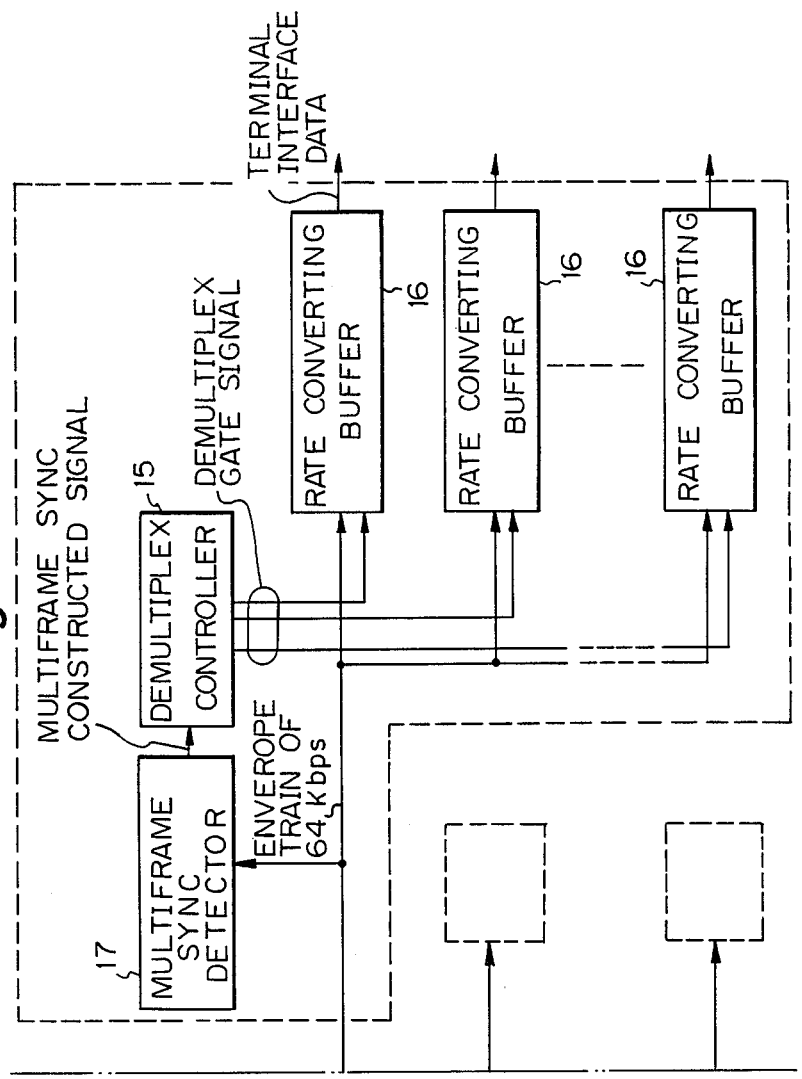
Figure 38:
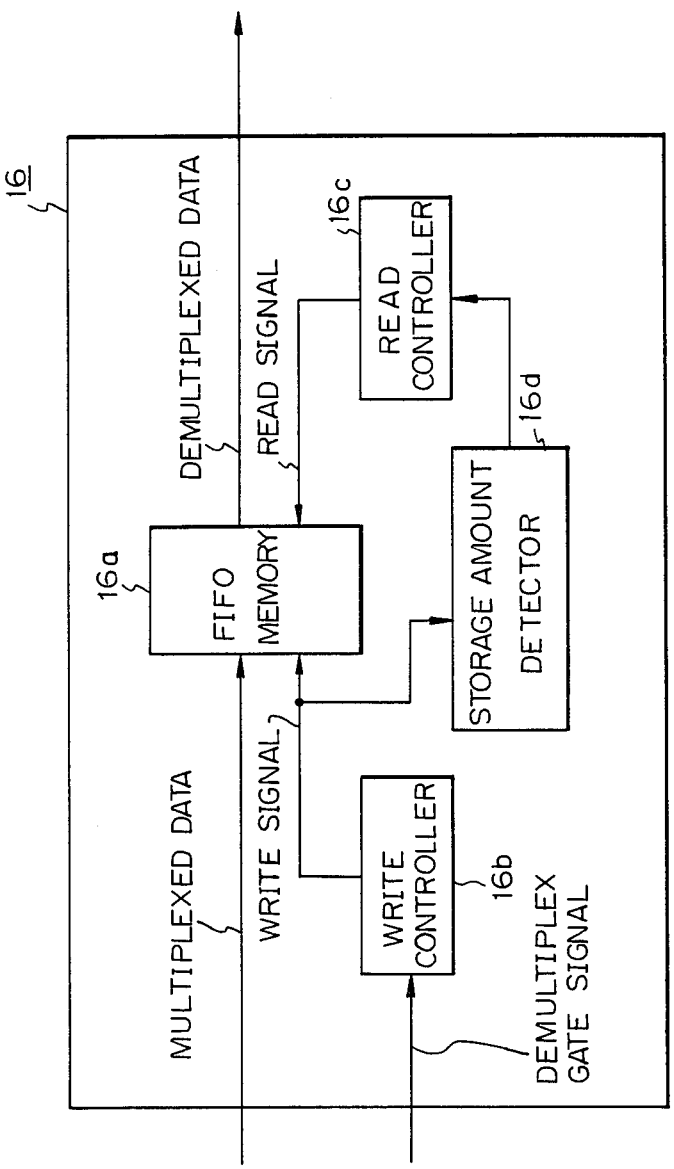
FIG. 38 is a constructional diagram of a conventional rate converting buffer.

Since the internal construction of the rate converting buffer 1800 in the example of the construction shown in FIG. 18 is similar to that in FIG. 36, its description is omitted here.

Figure 20:
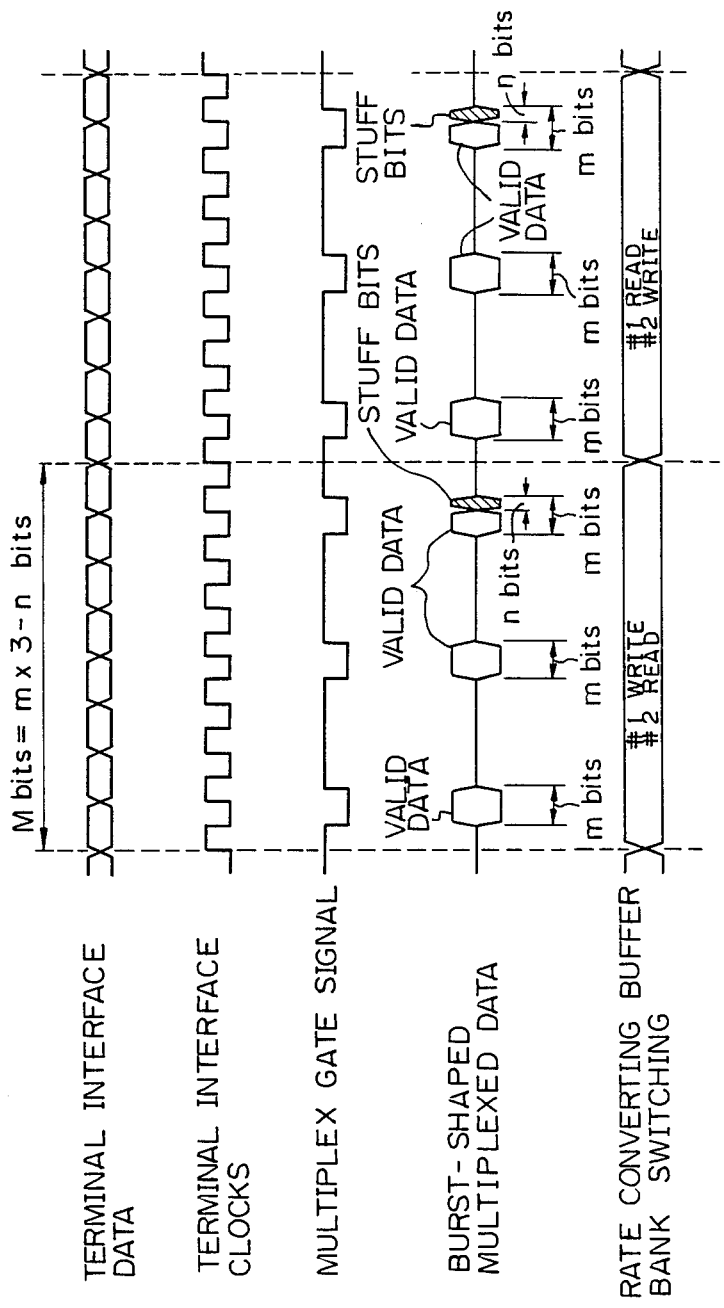
FIG. 20 is an operation timing chart for a rate converting buffer according to an embodiment of the invention.
Figure 21:
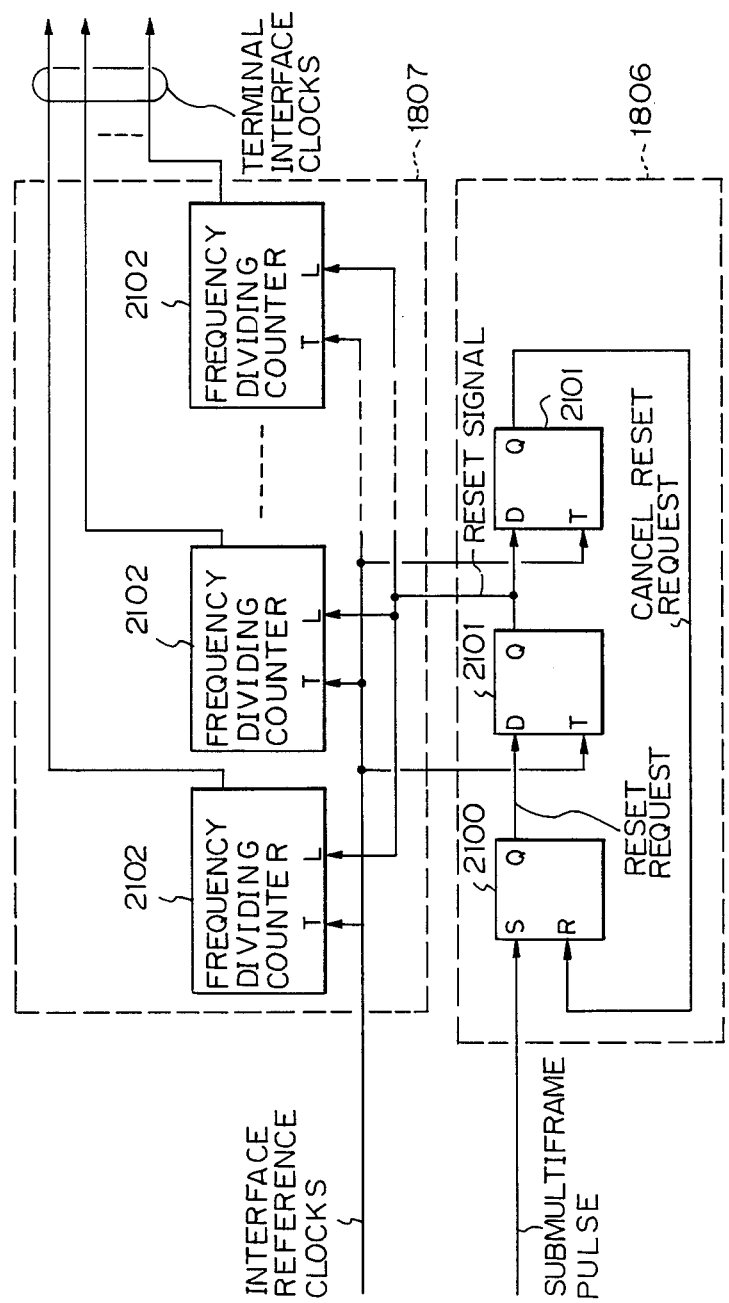
FIG. 21 is a diagram showing examples of constructions of a section to produce clocks for interface with a terminal and of a frequency division resetting circuit according to an embodiment of the invention.
Figure 22:
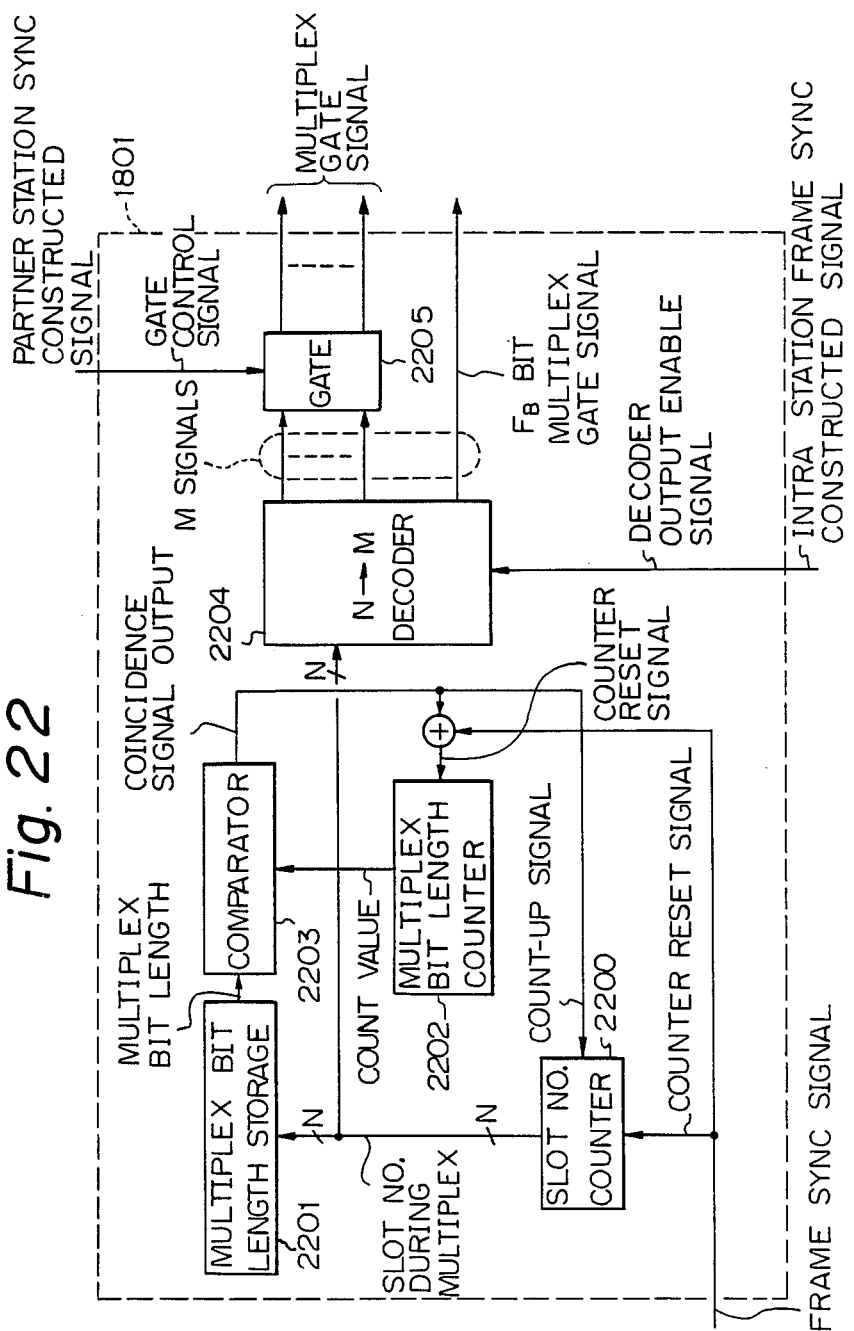
FIG. 22 is a diagram showing an example of a constructions of a multiplex control section according to an embodiment of the invention.

FIG. 20 is a diagram showing the operation of the rate converting buffer 1800 in the invention and illustrates the stuffing operation in the case of adding a stuff bit every three transmission frames. FIG. 21 shows examples of constructions of the terminal interface clock producing section 1807 and frequency division resetting circuit 1806. In the diagram, reference numeral 2102 denotes frequency dividing counter which are independently arranged and which frequency divide and output various kinds of terminal interface clocks; 2100 denotes a set/reset type flip-flop; and 2101 denotes D-type flip-flops. FIG. 22 shows an example of a construction of the multiplex control section 1801 in the invention. In the diagram, reference numeral 2200 denotes a slot number counter to count the time slot number to perform the multiplex; 2201 denotes a multiplex bit length storing section to supply a multiplex bit length data of each time slot; 2202 denotes a multiplex bit length counter to count the multiplex bit length of each time slot; 2203 denotes a comparator to detect whether the multiplex of the data of a predetermined bit length has been finished or not; 2204 denotes a decoder to sequentially output M multiplex gate signals on the basis of the N slot number signals during the multiplex; and 2205 denotes a gate to output and control the multiplex gate signal.

Figure 23A:
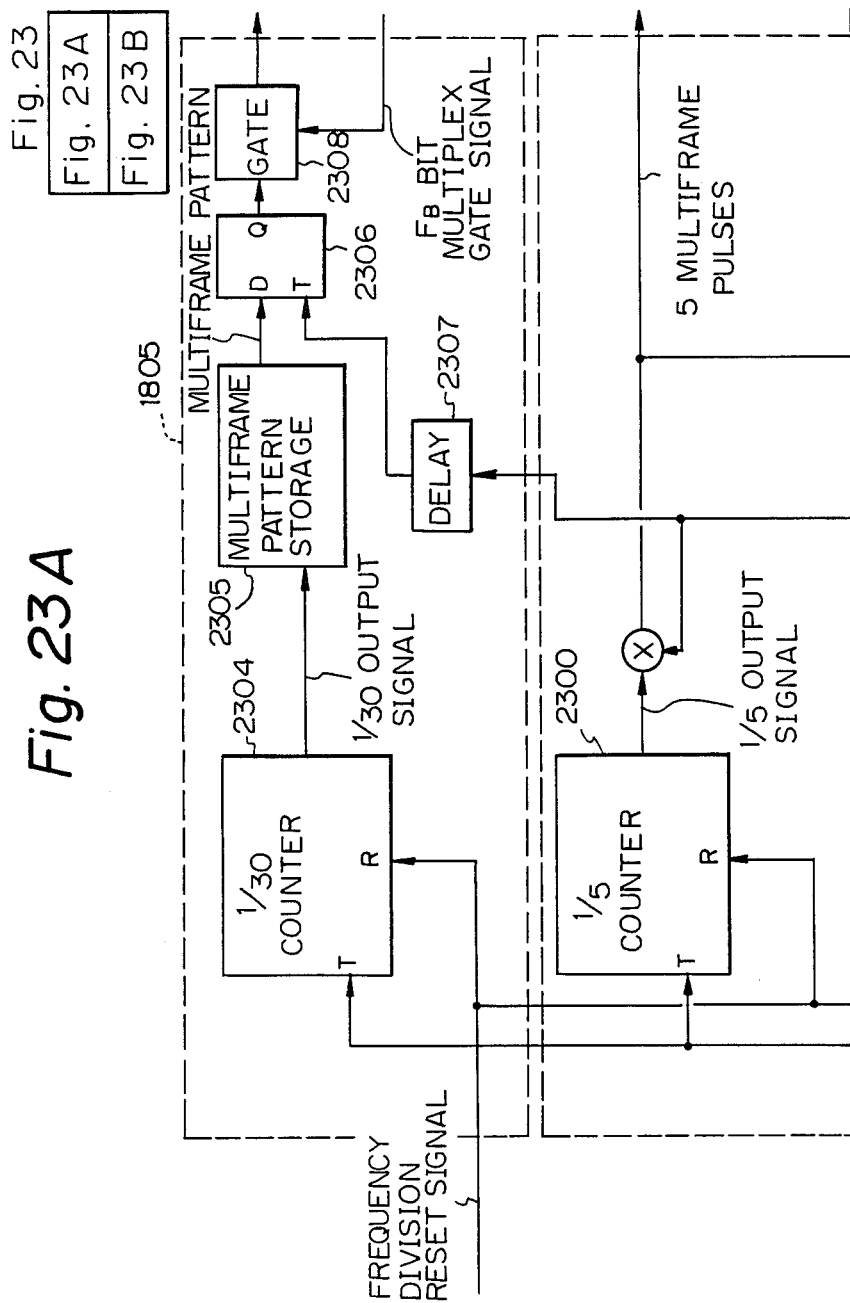
FIG. 23 is a diagram showing examples of constructions of a submultiframe pulse producing section and of a multiframe pattern producing sect.:on according to an embodiment of the invention.
Figure 23B:
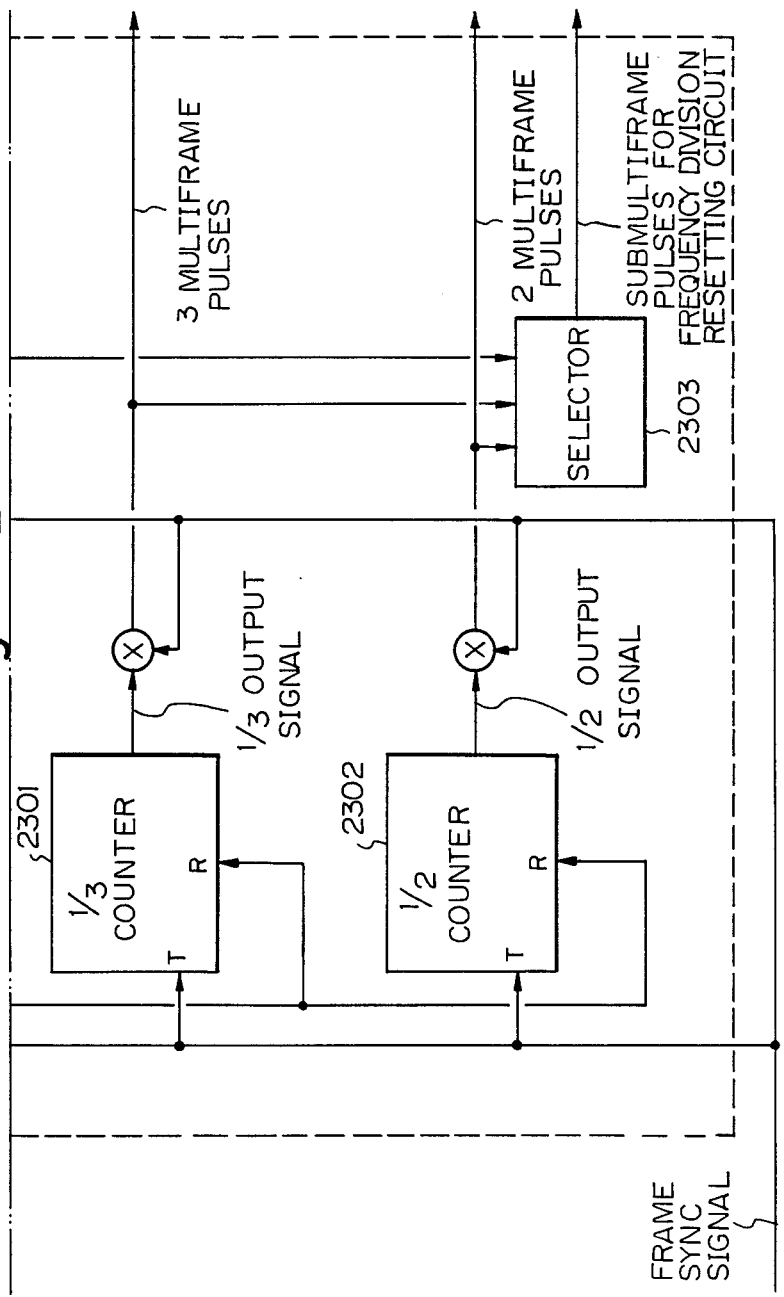

FIG. 23 shows examples of constructions of the multiframe pulse producing section 1804 and multiframe pattern producing section 1805 in the invention. In the diagram, reference numeral 2304 denotes a 1/30 frequency dividing counter to frequency divide a frame sync signal; 2300 denotes a 1/5 frequency dividing counter; 2301 denotes a ⅓ frequency dividing counter; 2302 denotes a ½ frequency dividing counter; 2303 denotes a select or to output submultiframe pulses for the frequency division resetting circuit 1806 on the basis of a combination of the line rate and the multiplexed terminal data rate; 2305 denotes a multiframe pattern storing section to output a 30-multiframe pattern; 2306 denotes a D-type flip-flop; 2307 denotes a delay for delaying the frame sync signal by the amount of time corresponding to three clocks; and 2308 denotes a gate which is opened at the multiplex timing of the $F_B$ bit 103.

In FIG. 18, the transmission data input from a terminal via the interface is stored in the rate converting buffers 1800 by the interface clocks of each terminal which were generated from the terminal interface clock producing section 1807. In order to synchronize the clocks for transmission with the line clocks, the reference clocks for interface which are produced by the clock producing section 1808 and have a constant synchronizing relation with the line clocks are subjected to a predetermined frequency dividing process in the terminal interface clock producing section 1807. The resultant frequency divided clocks are used as terminal interface clocks of 1200 Hz, 2400 Hz, etc. Next, each terminal interface data stored into the rate converting buffers is subjected to a stuffing process by the multiplex gate signal from the multiplex control section 1801 and is sequentially multiplexed by the amount of a predetermined number of bits at a time. The multiplex control section 1801 outputs the multiplex gate signals for the H 101, C 102, $F_B$ 103 and $CH_1$ to $CH_N$ 104 etc., and each data channel is multiplexed in a burst manner. The data of H 101, C 102, $F_B$ 103, and $CH_I$ to $CH_N$ 104 is written into the elastic buffers 1802. On the other hand, the frame sync bit F 100 produced by the frame sync pattern producing section 1803 and the ECC code 105 are added to the head of the data written in the elastic buffer 1802 on a 301-bit unit basis and the resultant data are transmitted synchronously with the line clocks (64 kbps=N). The submultiframe pulse producing section 1804 frequency divides the frame sync signal generated from the clock producing section 1808 and outputs the submultiframe pulses of 2, 3, 5 etc. At this time, the multiframe pattern producing section 1805 produces the 30-multiframe pattern as the least common multiple of the 3 and 5 multiframes. The 30-multiframe pattern is multiplexed in response to the multiple gate signal from the multiplex control section 1801 to the $F_B$ 103.

As shown in FIG. 19, each data to be multiplexed is taken out of each rate converting buffer and producing section by the respective multiplex timing signal "--multiplex L" and multiplexed to the transmission framing slot. Each multiplex control signal is supplied a shown in FIG. 10.

FIG. 20 shows a stuffing operation for every three multiframes in the double memories 1503 which are switched every submultiframe as shown in FIG. 15. The data which was input from a terminal via the interface by the terminal interface clock is written on an M-bit unit basis into the rate converting buffers 1800 whose writing and reading modes are switched every three transmission frames. After the operation mode of the buffer was switched from the writing mode to the reading mode, the data are read out m bits at a time in a burst manner at the timing of the multiplex gate signal. The undefined data of n bits other than the terminal interface data are also included in the m×3 bits of the data which was read out for the reading time. These n bits are set into stuffing bits and multiplexed together with the terminal data. The n bits of the undefined data of the stuffing bits are destuffed by setting the number of terminal interface clocks in $M = m \times 3 - n$ in three transmission frames when the data are from the similar rate converting buffer 1800 to the terminal on the reception side. In order to certainly perform the stuffing on the transmission side and the destuffing on the reception side in this manner, the phase of the switching timing of the double memories 1503 of every small multiframe pulse and the phase of the write/read clocks need to be coincident. FIG. 21 shows an example of a construction of a circuit to obtain the phase synchronization. In the diagram, each of a plurality of frequency dividing counters 2102 frequency divides the interface reference clocks at a constant frequency dividing ratio, respectively, and outputs predetermined terminal interface clock. On the other hand, the submultiframe pulses set the SR flip-flop 2100 and produces a reset request signal. This reset request signal is sampled by the reference clocks for interface and is used as a reset signal synchronized with the interface reference clocks. In response to this reset signal, the counters 2102 are again loaded with the initial patterns and restart the frequency dividing operations. The reset signal is again sampled by the D-type flip-flop 2101 at the post stage and by resetting the SR flip-flop 2100, the reset request signal is cancelled. For example, the frequency value of 5.76 MHz is used for the interface reference clocks. Therefore, even if the phase of the timing for the submultiframe pulses is deviated from the phase of the terminal interface clocks, this deviation is up to about 170 nsec (1/5.76 MHz). This value corresponds to a jitter of at most about 1% even if the frequency of the terminal interface clocks is 64 kHz, so that no problem will occur in the actual situation.

FIG. 22 shows an example of a construction of the multiplex control section 1801 to produce the multiplex gate signal. The slot number counter 2200 which was reset by the frame sync signal indicative of the delimiter of the transmission frames output N signals indicative of the time slot number during the multiplex as a slot number "0". At the same time, the multiplex bit length counter 2202 is also reset by the frame sync signal and by outputting "0" as a count value, it is indicated that the multiplex ar the slot number "0" is not executed yet. For the N slot number signals which are generated from the slot number counter 2200, the multiplex bit length storing section 2201 outputs the multiplex bit Length at the relevant time slot to the comparator 2203. When the multiplexing process is started and the counter 2202 starts counting, the comparator 2203 which receives the output from the multiplex bit length storing section 2201 and the output from the multiplex bit length counter 2202 monitors both signals until they coincide. When the multiplexing process is continued and both input signals to the comparator 2203 coincide, the comparator 2203 supplies a coincidence signal output to the counters 2202 and 2200 and informs the counters that the multiplex for that time slot has been completed. The coincidence signal output from the comparator 2203 resets the counter 2202 and also counts up the count value of the slot number counter 2200 by only one and starts the multiplexing process for the next time slot. By sequentially performing those operations, the N slot number signals during the multiplex from the slot number counter 2200 hold the respective patterns for only the period of time corresponding to a predetermined bit length. On the other hand, the N→M decoder 2204 operates so as to make valid only one the M output signals in correspondence to the N input signal patterns. Since these N input signals are the slot number signals during the multiplex from the counter 2200, the output signal from the N→M decoder 2204 can be directly used as the multiplex gate signal. In this manner, the multiplex gate signal to each section is sequentially output by an amount of a predetermined bit length at a time by the foregoing series of operations.

FIG. 23 shows examples of constructions of the submultiframe pulse producing section and multiframe pattern producing section. In the diagram, the 1/5, $\frac{1}{3}$, and $\frac{1}{2}$ frequency dividing counters 2300, 2301, and 2302 which were reset by the frequency division reset signal frequency divide the frame sync signal into 1/5, $\frac{1}{3}$, and $\frac{1}{2}$ respectively. The ANDs of the outputs of these counters and the frame sync signal are calculated, and these outputs are shaped into the signals each having the same time width as that of the frame sync signal and are output to the respective sections as the 5-, 3-, and 2-multiframe pulses. On the other hand, the selector 2303 selects the submultiframe pulse corresponding to the least common multiple of the signal switches which are actually used among the 5-, 3-, and 2-multiframe pulses corresponding to the line rate and multiplex format at that time and the frame sync signal (corresponding to one multiframe pulse). Then, the selector 2303 outputs the selected pulses as the submultiframe pulses for the frequency division resetting circuit.

The 1/30 frequency dividing counter 2304 which was reset by the frequency dividing reset signal counts the frame sync signal. An output of the counter is input to the multiframe pattern storing section 2305. The storing section 2305 outputs the multiframe pattern corresponding to the count value input. The multiframe pattern output is latched by the pulses which are obtained by delaying the frame sync signal by three clocks by the delay 2307 and is supplied to the gate 2308. The gate 2308 is opened by the multiplex gate signal of the $F_B$ bit. The $F_B$ pattern is multiplexed at the multiplex timing of $F_B$. In the embodiment described herein, there has been used the method whereby, when the bit stuffing is performed, the data which is surplus by only the number of stuffing bits which exceeds the number of bits in the terminal interface data written in the rate converting buffer 1800, is read out and multiplexed. However, it is also possible to construct the invention in a manner such that the section is provided for producing the stuffing bits necessary for multiplexing. These bits may then be added to the multiplex data.

The frequency division resetting circuit 1806 makes the reset signal synchronized with the reference clocks for interface by one SR flip-flop 2100 and two D-type flip-flops 2101. However, it is also possible to construct a differentiating device by two D-type flip-flops and an AND circuit by producing the submultiframe pulses of a width which is sufficiently longer (e.g., five times) than the period of the reference clocks for interface.

Figure 24:
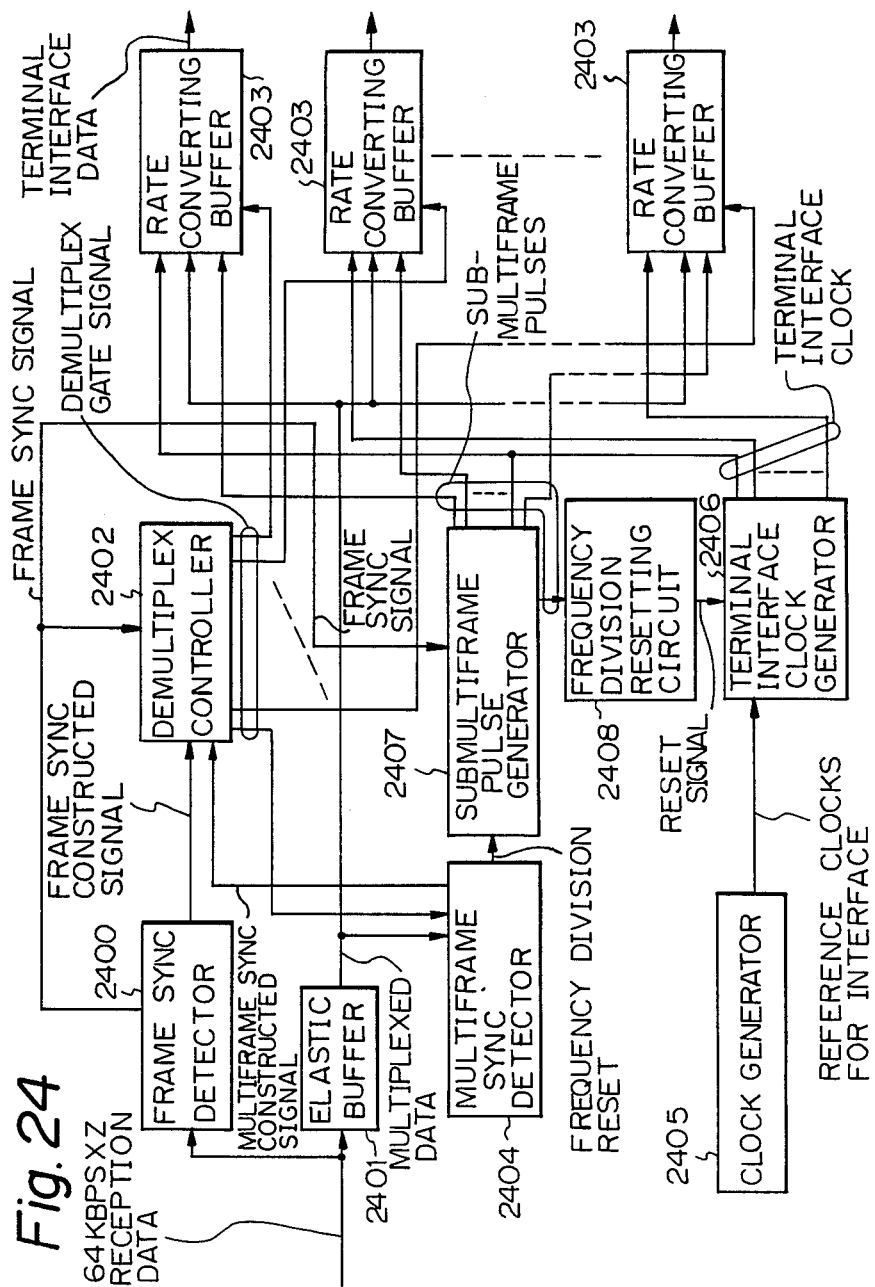
FIG. 24 is an internal constructional diagram of a demultiplex control system of multiplexed data according to an embodiment of the invention.

FIG. 24 shows an example of a construction in the case of demultiplexing the data train of the transmission frame format shown in FIGS. 1 and 2. In the diagram, reference numeral 2400 denotes a frame sync detecting section to search the frame sync bit $F_A$ 100 in the transmission frame and to establish the frame synchronization; 2401 denotes an elastic buffer to temporarily store the reception data; 2402 denotes a demultiplex control section to demultiplex the multiplexed data by a predetermined number of bits at a time; 2403 denotes rate converting buffers to smooth the data of each channel which was demultiplexed in a burst manner and to output the terminal side: 2404 denotes a multiframe sync detecting section to read the multiframe sync bit $F_B$ 103 in the transmission frame and to establish the multiframe synchronization; 2407 denotes a submultiframe pulse producing section to produce a signal to further divide the multiframe established by the multiframe sync bit $F_B$ train into submultiframes; 2405 denotes a clock producing section to smooth the jitter component of the reception clocks including the jitter from the line and to produce the reference clocks for interface having a constant synchronizing relation with the smoothed reception clocks; 2406 denotes a terminal interface clock producing section to frequency divide the reference clocks for interface and to produce interface clocks of various kinds of rates; and 2408 denotes a frequency division resetting circuit to initialize the terminal interface clock producing section 2406 by the period of the submultiframes.

Figure 25:
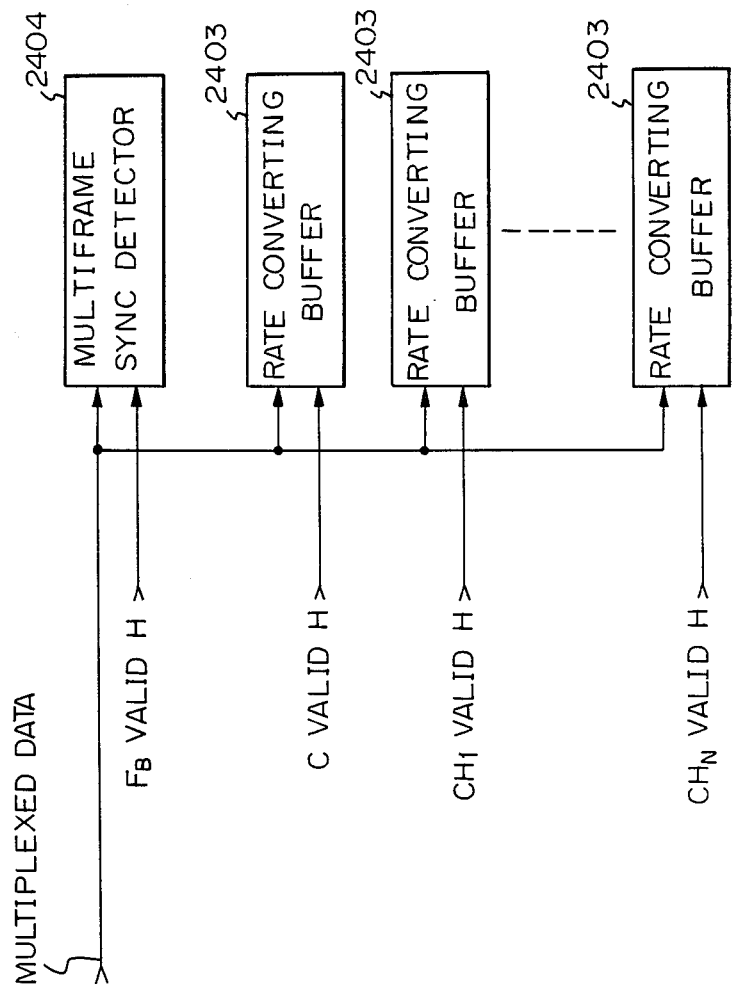
FIG. 25 is a diagram showing the concept of a construction of each demultiplex system in FIG. 24.

FIG. 25 is a diagram showing the concept of the demultiplexer in FIG. 24.

Figure 26:
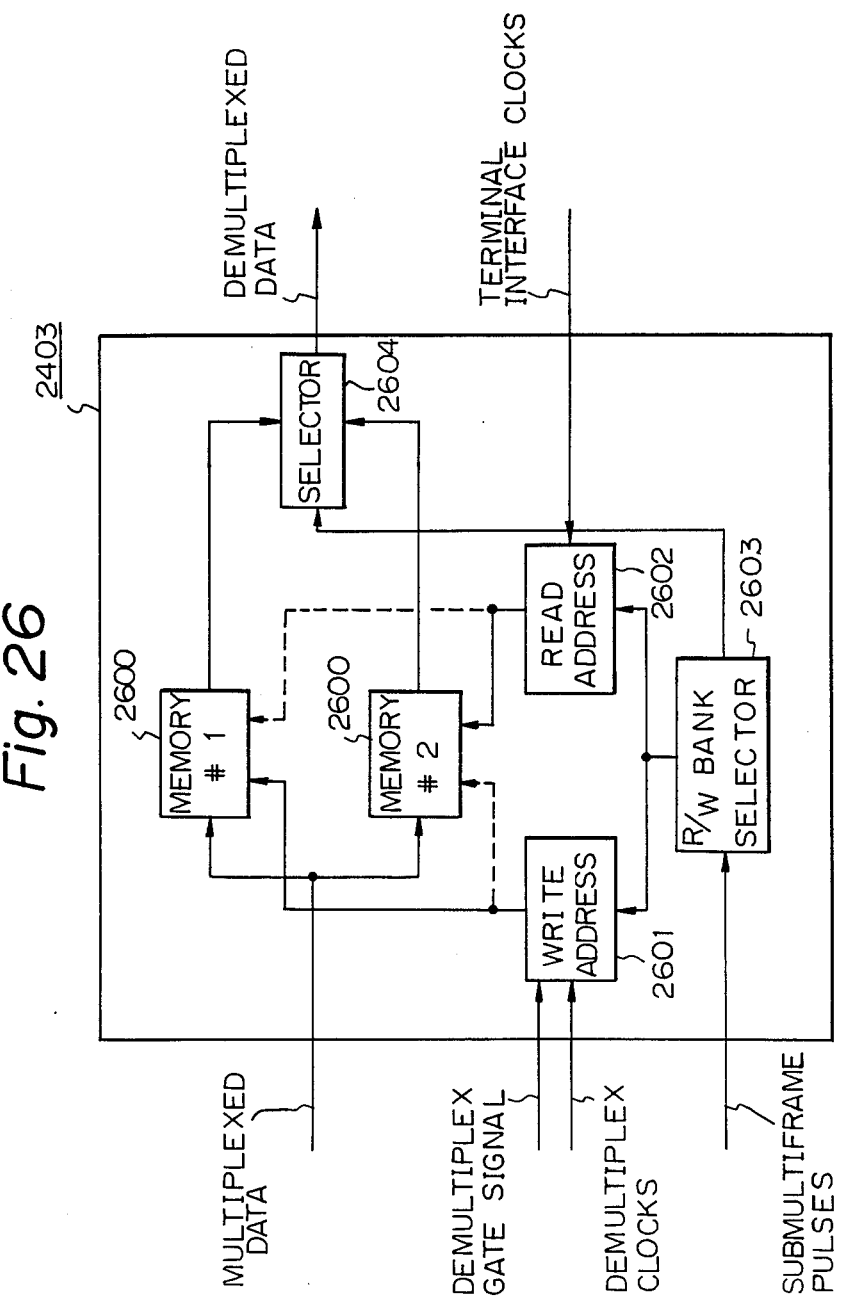
FIG. 26 is a constructional diagram of a rate converting buffer according to an embodiment of the invention.

FIG. 26 shows an example of an internal construction of the rate converting buffer 2403 in the invention. In the diagram, reference numeral 2600 denotes double memories which are constructed by two areas and apparently simultaneously perform the reading and writing operations; 2601 denotes a write address counter to designate write addresses in the double memories 2600; 2602 denotes a read address counter to designate read addresses in the double memories 2600; 2603 denotes an R/W bank selecting section to switch the reading/writing modes of the double memories 2600; and 2604 denotes a selector to output the data which was read out of either one of the double memories 2600 to the outside.

Figure 27:
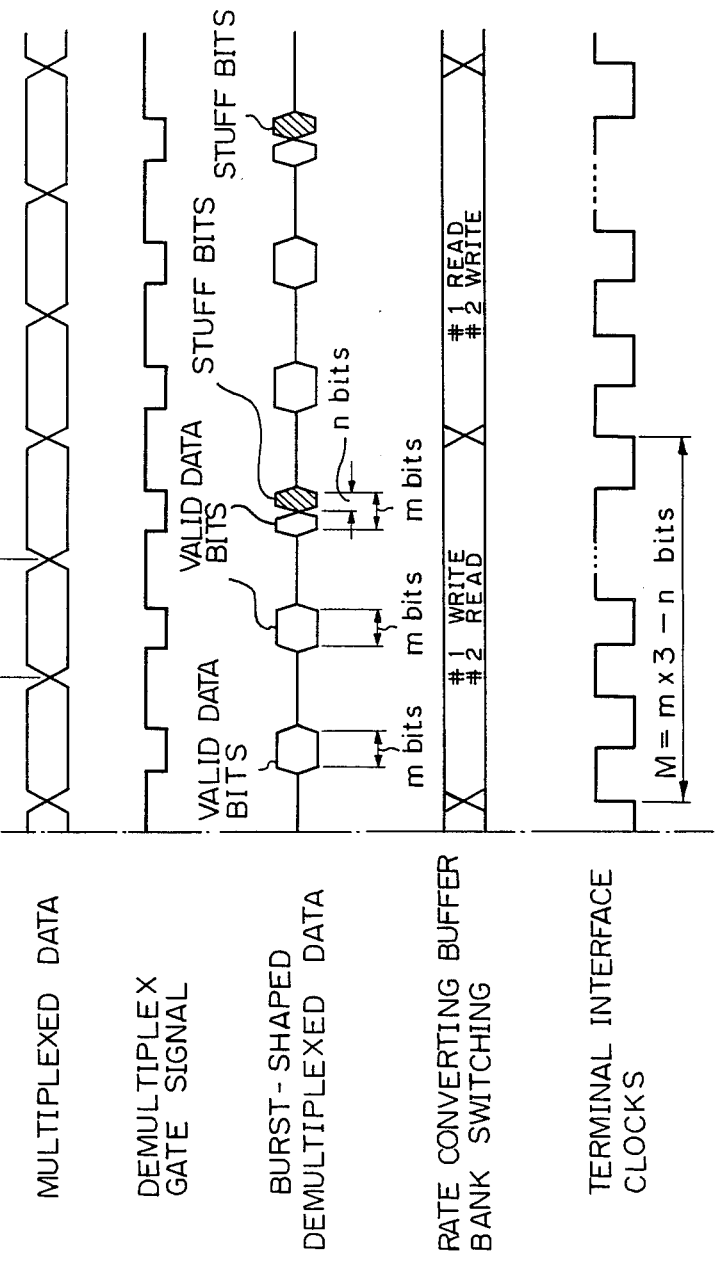
FIG. 27 is an operation timing chart for the rate converting buffer according to an embodiment of the invention.

FIG. 27 is a diagram showing the operation of the rate converting buffer 2403 in the invention and illustrates the destuffing operation in the case where stuff bits exist for every three transmission frames.

Figure 28:
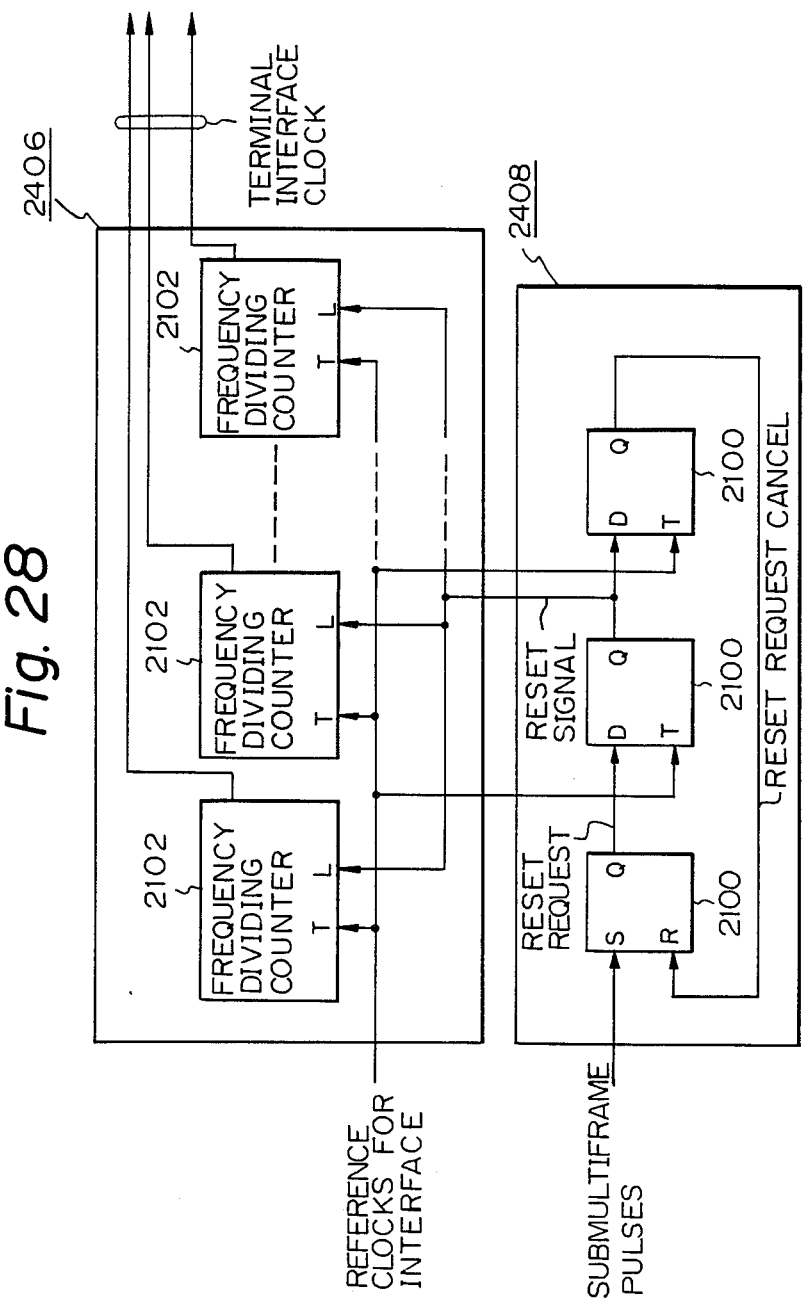
FIG. 28 is a diagram showing examples of constructions of a section to produce clocks for interface with a terminal and of a frequency division resetting circuit according to an embodiment of the invention.

FIG. 28 shows constructions of the terminal interface clock producing section 2406 and frequency division resetting circuit 2408. Since they are the same construction as shown in FIG. 21, further description will be omitted.

Figure 29:
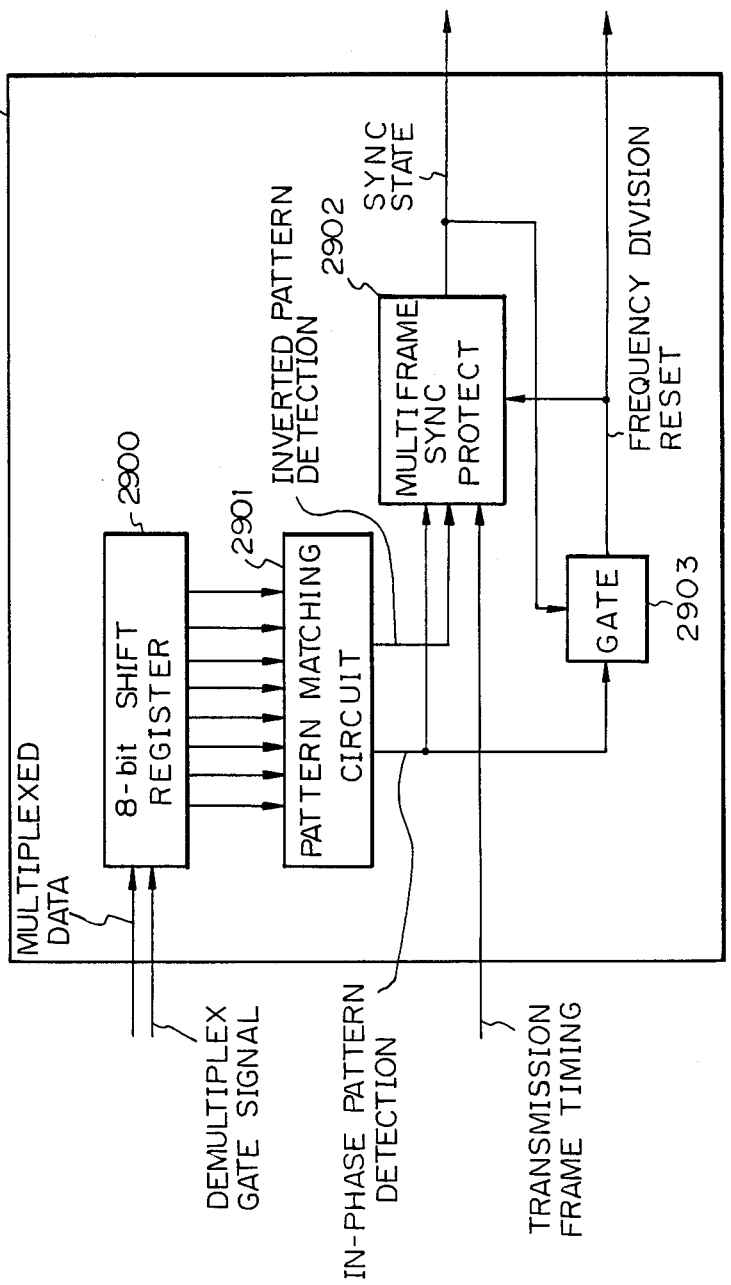
FIG. 29 is a constructional diagram of a multiframe sync detecting section according to an embodiment of the invention.

FIG. 29 shows an example of a construction of the frame sync detecting section 2404 in the embodiment. In the diagram, reference numeral 2900 denotes an 8-bit shift register to store a train of a multiframe sync-bit $F_B$ 103; 2901 denotes a pattern matching circuit to decide and detect the multiframe sync pattern; 2902 denotes a multiframe sync protecting section to prevent the erroneous pull-in of the multiframe synchronization; and 2903 denotes a gate to stop the output when the multiframe synchronization is established.

Figure 30:
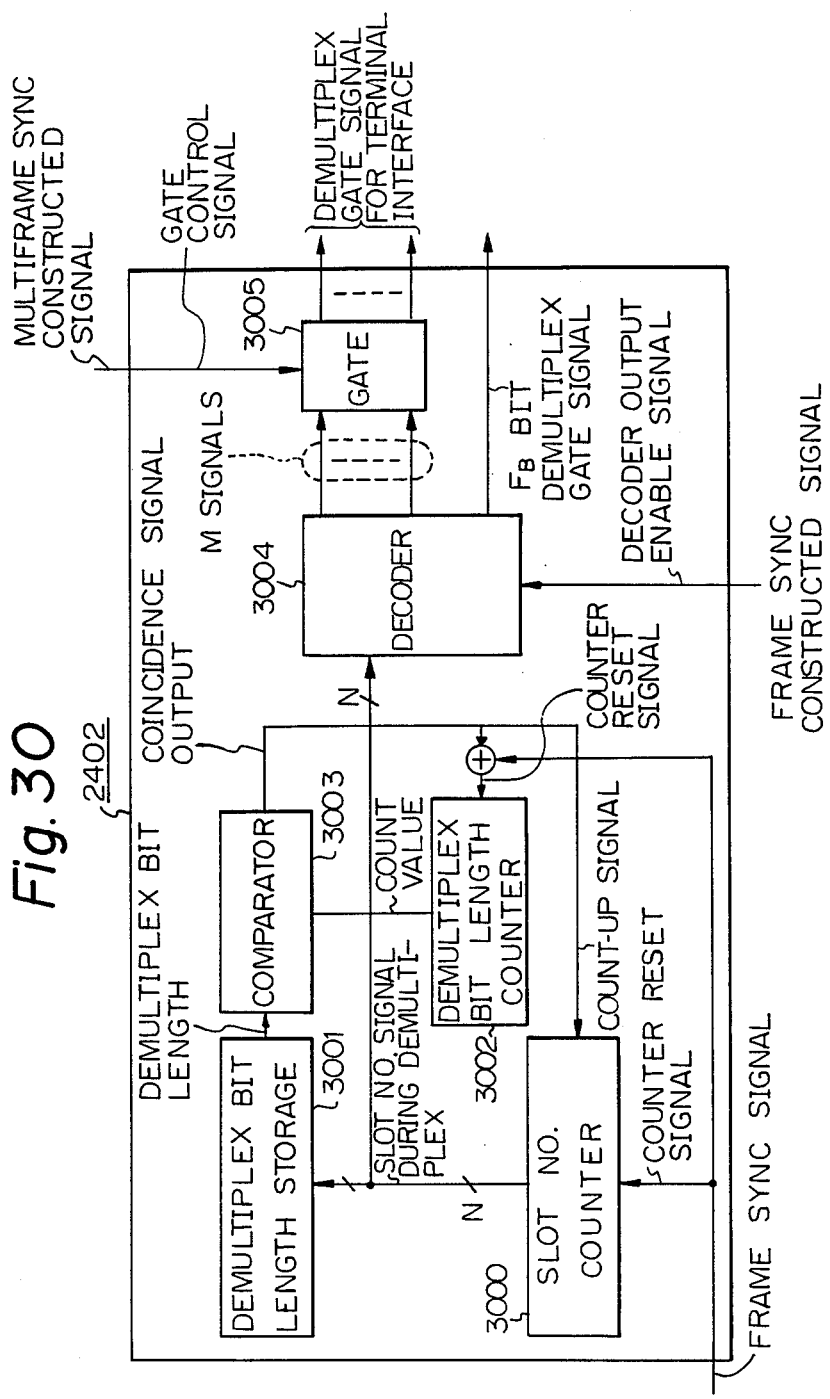
FIG. 30 is a constructional diagram of a demultiplex control section according to an embodiment of the invention.

FIG. 30 shows an example of a construction of the demultiplex control section 2402 in the embodiment. In the diagram, reference numeral 3000 denotes a slot number counter to count the time slot number to perform the demultiplex; 3001 denotes a demultiplex bit length storing section to supply a demultiplex bit length of every time slot; 3002 denotes a demultiplex bit length counter to count the demultiplexed bit length of each time slot word; 3003 denotes a comparator to detect whether the demultiplex of a predetermined bit length has been finished or not; 3004 denotes a decoder to sequentially output M demultiplex gate signals on the basis of N slot number signals during the demultiplex; and 3005 denotes a gate to control the output of the demultiplex gate signal.

Figure 31:
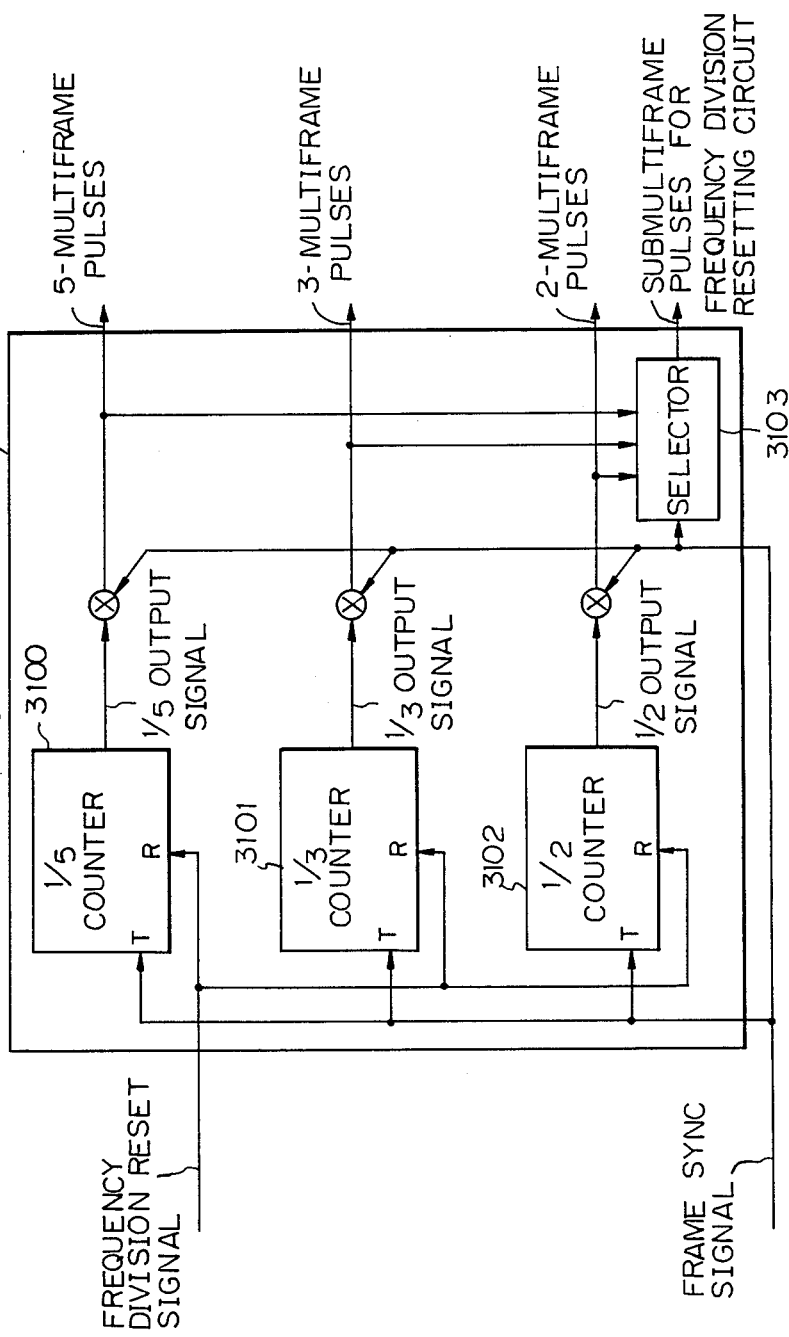
FIG. 31 is a constitutional diagram of a submultiframe pulse producing section according to an embodiment of the invention.
Figures 32, 33:
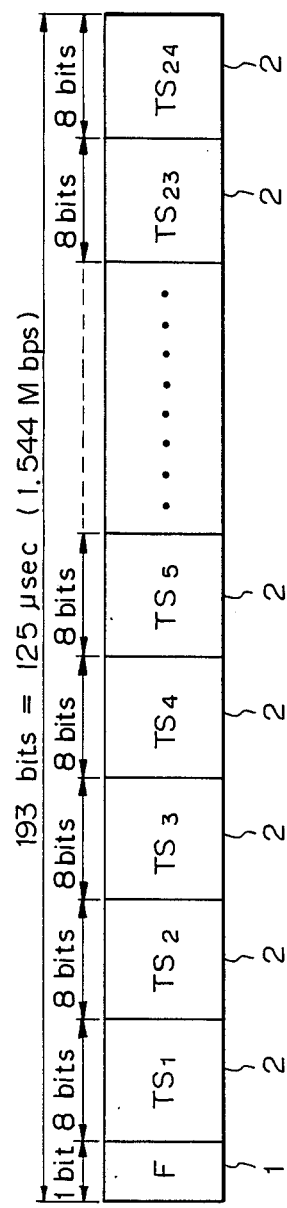
FIG. 32 is a diagram showing an example of a conventional transmission frame format.
FIG. 33 is a diagram showing the content of an F bit 1 in the conventional transmission frame format in FIG. 32.
Figure 34:
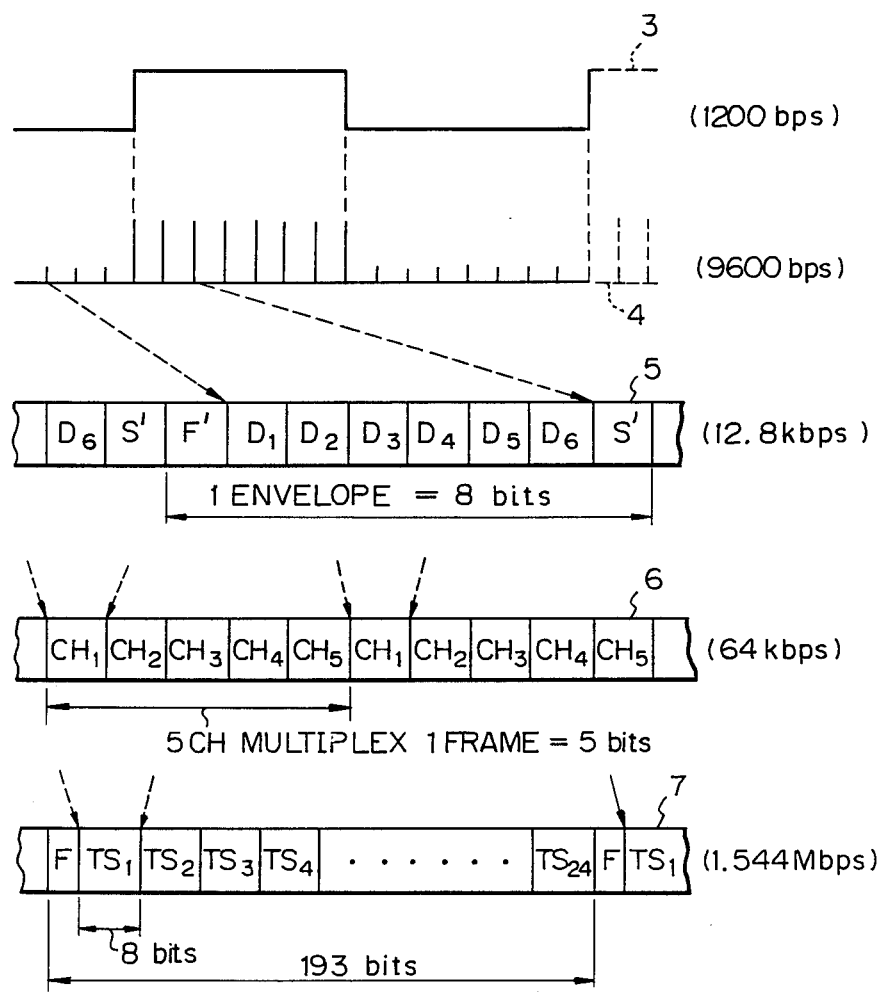
FIG. 34 is a diagram showing a procedure in which asynchronous data of 1200 bps is multiplexed to the conventional transmission frame in FIG. 32.
Figure 35:
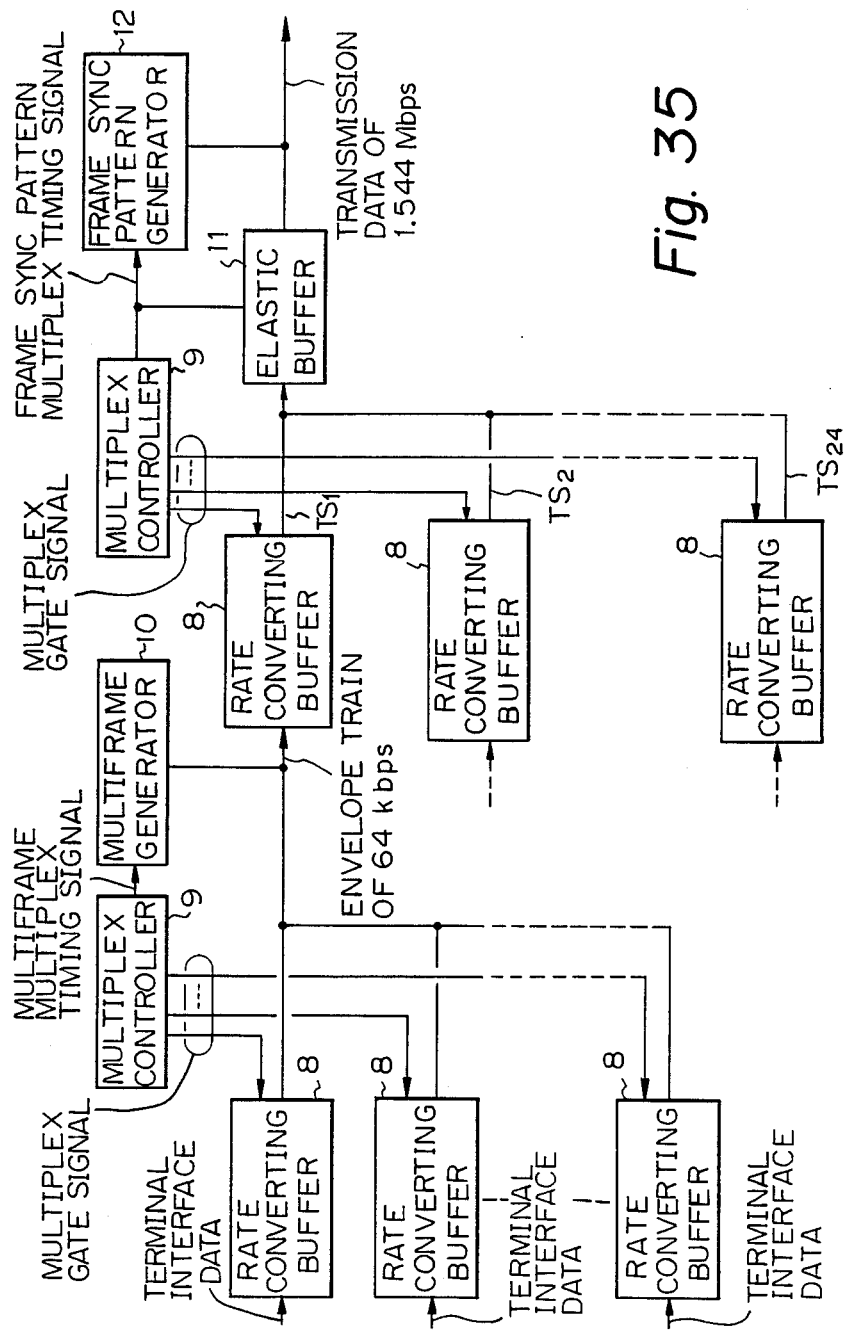
FIG. 35 is an internal constructional diagram of a conventional data multiplex control system.

FIG. 31 shows an example of a construction of the submultiframe pulse producing section 2407 in the embodiment In the diagram, reference numeral 3100 denotes the 1/5 frequency dividing counter to frequency divide the frame sync signal into 1/5; 3101 denotes a ⅓ frequency dividing counter; 3102 denotes a ½ frequency dividing counter; and 103 denotes a selector submultiframe pulses for the frequency division resetting circuit on the basis of a combination of the line rate and the multiplex terminal data rate.

In FIG. 24, a delimiter of every frame of the 64 kbps×N reception data train which was received from the is detected by the frame sync detecting section 2400 in a manner similar to the conventional system. The frame sync established signal is output to the demultiplex control section 2402.

On the other hand the multiplexed data stored in th elastic buffer 2401 is sequentially demultiplexed by a predetermined number of bits at a time by the demultiplex gate signal from the demultiplex control section 2402. However, when the multiframe sync established signal is not output from the multiframe sync detecting section 2404, the demultiplex control section 2402 operates in a manner such that the demultiplex gate signals to the time slots 104 for the respective multiplexed data channels of $CH_1$ to $CH_N$ are not output and only the demultiplex gate signal to the multiframe sync bit $F_B$ 103 is output. When it is confirmed by the multiframe sync detecting section 2404 that the multiframe synchronization has been established for the multiframe sync bit $F_B$ 103 train, the multiframe sync established signal is output to the demultiplex control section 2402. In response to the multiframe sync established signal, the demultiplex control section 2402 starts to output the header information 101, control data link 102, and demultiplex gate signals for the time slots 104 or the like for the respective multiplexed data channels of $CH_1$ to $CH_N$. The demultiplex of each data channel is performed in a burst manner. The data of the time slots 104 for the multiplexed data channels of $CH_1$ to $CH_N$ is written into the rate converting buffers 2403. On the other hand, the jitter which is ordinarily included in the reception clocks which are supplied to suppressed in the clock producing section 2405. On the basis of these clocks, the reference clocks for interface having a constant synchronizing relation with the reception clocks, e.g., 5.76 MHz are output. Th reference clocks for interface subjected to a predetermined frequency division by the terminal interface clock producing section 2406 and output as the terminal interface clocks of 1200 Hz, 2400 Hz, etc.

The submultiframe pulse producing section 2407 frequency divides the transmission frame timing signal, i.e., frame pulses, by use of a frequency division reset signal timing, as a reference, which is output from the multiframe sync detecting section 2404 and generates the submultiframe pulses of 2, 3, 5 etc. At this time, the frequency division reset signal is output from the multiframe sync detecting section 2404 when the multiframe synchronization is not established yet and at the same time a multiframe sync pattern was found out in the bit train of the multiframe sync bit $F_B$ 103. No frequency division reset signal is output after the multiframe synchronization has been once established. The multiframe synchronization by the multiframe sync bit $F_B$ 103 is preset into 30 as the least common multiple of the 2, 3, and 5 multiframes. These submultiframe pulses are supplied to the rate converting buffers 2403 and the stuff bits are deleted and at the same time, they are reproduced as the reset signal in the frequency division resetting circuit 2408. Thus, a constant phase synchronizing relation is obtained between the clocks for terminal interface and the submultiframe period. The demultiplexed and destuffed data are continuously output from the rate converting buffers 2403 synchronously with the interface clocks.

As shown in FIG. 25, the multiplexed data are supplied as a common data line to each rate converting buffer. Each interval for storing the data is controlled by the "valid H" signal. Each "valid H" signal is supplied similarly to what is shown in FIG. 13.

An example of a construction of the rate converting buffer in the embodiment will now be described with reference to FIG. 26. In the diagram, the multiplexed data are given to the double memories 2600 consisting of the memories #1 and #2. The double memories 2600 take in the data by the amount or a predetermined number of bits synchronously with the demultiplex clocks for the period of time when the demultiplex gate signal is input to the write address counter 2601. Into which one of the double memories 2600 consisting of the memories #1 and #2 data are written is determined by an instruction from R/W bank selecting section 2603. The write address and write signal are given to only one of the double memories 2600 into which the writing mode is designated. On the other hand, data are continuously read out from one of the double memories 2600 into which the reading mode is designated by the R/W bank selecting section 2603 synchronously with the terminal interface clocks. At this time, predetermined read address information is given from the read address counter 2602 to the double memories 2600. Since two kinds of read data exist on the side of the memory #1 and on the side of the memory #2 the selector 2604 outputs only either one of the read to the post stage in accordance with an instruction from the selecting section 2603. In addition, the selecting section 2603 alternately switches the writing and reading modes by the pulses of the submultiframe synchronization which is determined by the line rate and terminal interface rate.

FIG. 27 shows a destuffing operation of every three multiframes in the double memories which are switched every submultiframe as shown in FIG. 26. The data of m bits multiplexed to each transmission frame is demultiplexed in a burst manner on an m-bit unit basis at the time of the demultiplex gate signal and written into the rate converting buffers 2403. At this time, even if n stuff bits exist in three transmission frames, they are written into the rate converting buffers 2403 similarly to the other valid bits without being regarded as the stuff bits. On the other hand, the reading and writing operations of the double memories 2600 in the rate converting buffer 2403 are alternately switched every three transmission frames. Immediately after the operation mode was switched to the reading mode, the data of $m \times 3$ bits exists in the memory. The n stuff bits also exist in the data of $m \times 3$ bits. In this case, by setting the number of terminal interface clocks into $M = m \times 3 - n$ and then performing the reading operation, the n stuff bits are not read out even if they were written into the rate converting buffer 2403, so that this results in that the destuffing was performed. In order to certainly perform the destuffing in this manner, the phase of the switching timing of the double memories 2600 at every submultiframe pulse, and the phase of the interface clocks for reading need to be coincident.

FIG. 28 shows an example of a circuit construction to obtain the phase synchronization. As to the operation of the circuit shown in FIG. 28, the description of the operation of the circuit shown in FIG. 21 is to be referred to.

The operation of the multiframe sync detecting section 2404 will now be described with reference to FIG. 29 showing an example of a construction of this detecting section. The multiplexed data which is not subjected to a demultiplexing process is written into the 8-bit shift register 2900 one bit by one synchronously with the demultiplex gate signal and becomes a data train of the multiframe sync bit $F_B$ 103. This multiframe sync bit $F_B$ 103 train is detected as a multiframe sync pattern by the pattern matching circuit 2901. This multiframe sync pattern consists of the 8-bit pattern and its inverted pattern and is previously multiplexed such that these patterns alternately appear every 15 multiframes. An 8-bit pattern detection signal and an inverted pattern detection signal which are output from the pattern matching circuit 2901 are supplied to the multiframe sync protecting section 2902. After it was confirmed that both signals alternately appear at every predetermined transmission frame timing period, a signal indicative of the sync state is output. The operation of the multiframe sync protecting section 2902 is stopped when the multiframe synchronization is not established yet and 8-bit sync pattern is not detected. When the 8-bit pattern detection signal is output from the pattern circuit 2901, this signal is transmitted through the gate 2903 and initializes the protecting section 2902, thereby allowing the multiframe synchronization to be searched. Subsequently, when the inverted pattern detection signal is output, the multiframe synchronization is established and the gate 2903 is closed.

FIG. 30 shows an example of a construction of the demultiplex control section 2402 to produce a demultiplex gate signal at its output. The slot number counter 3000 is reset by the frame sync signal indicative of the delimiter of the transmission frames and outputs N signals indicative of the time slot numbers during the demultiplex as the slot number 0. At the same time, the demultiplex bit length counter 3002 is also reset by the frame sync signal and outputs "0" as the count value. Thus, it is indicated that the demultiplex at the slot number 0 is not executed yet. In correspondence to the N slot number signals which are output from the slot number counter 3000, the demultiplex bit length storing section 3001 outputs the multiplex bit length at the relevant time slot to the comparator 3003. When the demultiplexing process is started and the demultiplex bit length counter 3002 starts the counting operation, the comparator 3003 which received the output from the storing section 3OOI and the output from the counter 3002 monitors both signals until they coincide. When the demultiplexing process is continued and both input signals of the comparator 3003 coincide, the comparator 3003 supplies a coincidence signal output to the demultiplex bit length counter 3002 and slot number counter 3000 and informs the end of the demultiplex for that time slot. The coincidence signal output from the comparator 3003 resets the counter 3002 and also increases the count value of the counter 3000 by only one and at the same time, it activates the demultiplexing process for the next time slot. By sequentially performing these operations, the N slot number signals during the demultiplex from the slot number counter 3000 keep the respective patterns for only the period of times corresponding to predetermined bit lengths, respectively. On the other hand, the decoder 3004 makes effective only one of the M output signals in correspondence to the N input signal patterns. Since the N input signals are the signals of the slot numbers during the demultiplex from the slot number counter 3000, the output signals from the decoder 3004 can be directly used as the demultiplex gate signal. However, when the reception transmission frame synchronization is not established, the demultiplexing process is meaningless. Therefore, the decoder 3004 makes invalid all of the M output signal until the frame sync established signal is input. When the frame sync established signal is once input, the M output signals are sequentially made valid and transmitted to the outside. However, until the multiframe synchronization is established, the gate 3005 is closed such that the signals other than the multiframe sync bit $F_B$ demultiplex gate signal are not made operative. In this manner, the demultiplex gate signal of each section is sequentially output by a predetermined bit length at a time by the series of operations.

FIG. 31 shows an example of a construction of the submultiframe pulse producing section 2407. In the diagram, the 1/5, ⅓, and ½ frequency dividing counters 3100, 3101, and 3102 which were reset by the frequency division reset signals respectively frequency divide the frame sync signal into 1/5, ⅓, and ½. The ANDs of the outputs of these frequency dividing counters and the frame sync signal are calculated, so that these outputs are shaped into the signals each having the same time width as the frame sync signal. The resultant 5, 3, and 2 multiframe pulses are output to the respective sections. On the other hand, the selector 3103 selects the submultiframe pulses corresponding to the least common multiple of the pulses which are actually used among the 5, 3 and 2 multiframe pulses corresponding to the line rate at that time and multiplex format and the frame sync signal (also referred to as 1-multiframe pulses). The selected submultiframe pulses are output as the submultiframe pulses for the frequency division resetting circuit.

In the embodiment, on the basis of the presence or absence of the multiframe sync established signal from the multiframe detecting section 2404 the demultiplex gate signal output from the demultiplex control section 2402 is selectively output, thereby preventing the writing of the unnecessary data into the rate converting buffer 2403 in the state in which the multiframe synchronization is not established. However, it is also possible to construct in a manner such that the demultiplex gate signals are always output for all of the time slots and on the reading side of the rate converting buffers 2403, the data output is stopped when the multiframe synchronization is not established yet.

What is claimed is:

1. A data multiplex transmission system for multiplexing and transmitting digital data streams by constructing a fixed length transmission frame of k bits (k is an integer of 1 or more) with respect to a line having a transmission rate of 64 kbps×N (N is an integer of 1 or more), comprising:
   means for selecting a value of k such that a repetitive period $f_F = 64$ [kbps] $\times N$ [Hz] of said fixed length transmission frame k [bits]

is an integer, said integer being the integer which allows the ratio of said $f_F$ to the data rate of each of said data streams to be an integer for as many of said data rates as possible and for providing a time slot of a fixed length into the transmission frame for the data rate such that the ratio of said $f_F$ and this data rate is an integer, and for multiplexing said digital data;
   means for obtaining a value of a (a is an integer of 1 or more), such that the value of $a \times f_F$ is greater than the data rate and such that the rate of $a \times f_F$ to this data rate is an integer, for setting the least common multiple of various values of a corresponding to the data rates such that the ratios of $f_F$ to these data rates are not integers into the number of transmission frames included in a multiframe, for providing a time slot of a fixed length into the transmission frame, for performing a bit stuffing on a unit basis of said a transmission frames, and for multiplexing said digital data;
   means for producing a multiframe sync code to discriminate the synchronization of the multiframe so as to obtain the least common multiple and for multiplexing to the transmission frame; and
   means for producing a frame sync code to discriminate the synchronization of said transmission frame and for multiplexing to the transmission frame.

2. A system according to claim 1, wherein the value of k is set to 320 bits×M (M is an integer of 1 or more), the value of $f_F$ is set to 200×N/M, the matching with the digital data having the rate of 1200 bps×L (L is an integer of 1 or more) is performed, and a 30-multiframe structure is constructed in order to perform the matching on a 2-, 3-, and 5-frame unit basis for the rate of 32 kbps×L (L is an integer of 1 or more).

3. A system according to claim 2, wherein an error correction coding is performed on a transmission frame unit basis by use of a (319, 301) compacted BCH code for the transmission frame having the length of 320 bits×M, and after performing the M-phase interleave (M is an integer of 1 or more), M bits are added as said transmission frame sync code, and thereby constructing the transmission frame.

4. A system according to claim 1, wherein the case of multiplexing voice coding data, a frame synchronization of the voice coding data are made coincident with a delimiter of said a frames (a is an integer of 1 or more) and the voice coding data are multiplexed, thereby establishing the frame synchronization of the voice coding data.

5. A system according to claim 4, wherein the case of applying a VA (voice activation) on a frame unit basis of said voice coding data, the state of said VA is discriminated by checking whether a bit pattern of said multiframe sync code is inverted or not.

6. A system according to claim 5, wherein said means for establishing the multiframe synchronization so as to obtain the least common multiple of the values of said a, a bit pattern of a fixed bit length j (j is an integer of 1 or more so as to satisfy the relation of j≦"the least common multiple of a") is preset, said bit pattern is multiplexed every bit to the j head transmission frame of the multiframe sync bits, and a fixed bit of "0" or "1" is multiplexed to the other transmission frames, thereby discriminating the multiframe synchronization.

7. A system according to claim 1, wherein the transmission frame of the fixed length, a plurality of kinds of frame formats having different headers are prepared, said frame formats are selected and multiplexed in accordance with the order of the data having a high priority, and the kind of said frame format is discriminated by the header information multiplexed in said transmission frame.

8. A data multiplex control system for a multiplex control circuit of multiplexed data frames having a transmission frame of a fixed length of P bits such that a repetitive period $$f_F = \frac{64 \, [kbps] \times N}{P \, [bits]} \, [Hz]$$

of the transmission frame of the fixed length is an integer in a line having a transmission rate of 64 kbps×(N is an integer of 1 or more), comprising:
   a multiframe producing section to produce multiframes each of which includes a P-bit fixed length transmission frame x K where K is an integer;
   a frame pulse producing section to produce submultiframe pulses to further divide said K frames of the multiframe signals which are output from said multiframe producing section into small portions; and
   double buffers which are alternately switched by said submultiframe pulses for inputting terminal interface data.

9. A system according to claim 8, further having a terminal interface clock signal producing section to phase synchronize a delimiter of the submultiframes and clocks for terminal interface by said submultiframe pulses.

10. A system according to claim 8, wherein the production of the multiframe sync bits in the transmission frame and the multiplex of the data are integratedly processed by a single multiplexing process.

11. A system according to claim 8, wherein a value of P of the transmission frame length having the fixed length is set to 320 bits×M (M is an integer of 1 or larger).

12. A system according to claim 11, further having a terminal interface clock signal producing section to phase synchronize a delimiter of the submultiframes and the clocks for terminal interface by said submultiframe pulses.

13. A system according to claim 11, wherein the production of the multiframe sync bits in the transmission frame and the multiplex of the data are integratedly processed by a single multiplexing process.

14. A demultiplex control system of multiplexed data in which a transmission frame having a fixed length of P bits such that a repetitive period $$f_F = \frac{64\ [kbps] \times N}{P\ [bits]}\ [Hz]$$

of said fixed length transmission frame becomes an integer at a transmission rate of 64 kbps×N (N is an integer of 1 or more) is detected by establishing the frame synchronization, and the detected fixed length transmission frame is demultiplexed and output as independent data, comprising;
 a multiframe sync detecting section to detect a multiframe by establishing a synchronization with respect to each frame among the P-bit fixed length transmission frame x K (K is an integer of 1 or more);
 a submultiframe pulse producing section to produce submultiframe pulses by dividing the K frames of the multiframe detected by said multiframe sync detecting section;
 rate converting buffer comprising, a double buffer for output of terminal interface data in which the reading and writing modes are alternately switched on the basis of the submultiframe pulses produced by said submultiframe pulse producing section; and
 a terminal interface clock signal producing section to produce a clock signal for terminal interface to sample the data which is output at the time of switching the reading and writing modes of said rate converting buffers.

15. A system according to claim 14, wherein a value of said fixed length transmission frame length P is set to 320 bits×M (M is an integer of 1 or more).

16. A data multiplex transmission method for multiplexing and transmitting digital data streams by constructing a fixed length transmission frame of k bits (k is an integer of 1 or more) with respect to a line having a transmission rate of 64 kbps×N (N is an integer of 1 or more), said method comprising the steps of:
 selecting a value of k such that a repetitive period $$f_F = \frac{64\ [kbps] \times N}{k\ [bits]}\ [Hz]$$

of said fixed length transmission frame is an integer, said integer being the integer which allows the ratio of said $f_F$ to the data rate of each of said data streams to be an integer for as many of said data rates as possible, and multiplexing said digital data by providing a time slot of a fixed length into the transmission frame for the data rate such that the ratio between said $f_F$ and this data rate is an integer;
 obtaining a value of a (a is an integer of 1 or more) such that the value of a×$f_F$ is greater than the data rate and such that the ratio of a×$f_F$ to this data rate is an integer;
 setting the least common multiple of various values of a corresponding to the data rates such that the ratios of $f_F$ to these data rates are not integers into the number of transmission frames included in a multiframe;
 providing a time slot of a fixed length into the transmission frame, and multiplexing said digital data by performing a stuffing of a unit basis of said a transmission frames;
 producing a multiframe sync code to discriminate the synchronization of the multiframe so as to obtain the least common multiple and multiplexing to the transmission frame; and
 producing a frame sync code to discriminate the synchronization of said transmission frame and multiplexing to the transmission frame.

17. A data multiplex control method for a multiplex control circuit of multiplexed data frames having a transmission frame of a fixed length of P bits such that a repetitive period $$f_F = \frac{64\ [kbps] \times N}{P\ [bits]}\ [Hz]$$

of the transmission frame of the fixed length is an integer in a line having a transmission rate of 64 kbps×N (N is an integer of 1 or more), said method comprising the steps of:
 producing multiframes each of which includes a P-bit fixed length transmission frame×K where K is an integer;
 producing submultiframe pulses to further divide said K frames of said produced multiframe signals into small portions;
 alternatively switching double buffers for inputting terminal interface data by said submultiframe pulses; and
 phase synchronizing a delimiter of the submultiframes and clocks for terminal interface by said submultiframe pulses;
 whereby the production of the multiframe sync bits in the transmission frame and the multiplex of the data are integratedly processed by a single multiplexing process.

18. A demultiplex control method of multiplexed data in which a transmission frame having a fixed length of P bits such that a repetitive period $$f_F = \frac{64\ [kbps] \times N}{P\ [bits]}\ [Hz]$$

of the fixed length transmission frame is an integer at a transmission rate of 64 kbps×N (N is an integer of 1 or more) is detected by establishing the frame synchronization, and the detected fixed length transmission frame is demultiplexed and output as independent data, said method comprising the steps of:
 detecting a multiframe by establishing synchronization with respect to each frame among the P-bit fixed length transmission frame×K (K is an integer of 1 or more);

producing submultiframe pulses by dividing the K frames of the detected multiframe;

alternately switching the reading and writing modes of a rate converting buffer on the basis of the produced multiframe pulses; and producing a clock signal for terminal interface at the time of switching the reading and writing modes of said rate converting buffers and sampling output data on the bases of the produced clock signal.

* * * * *